(12) United States Patent
Kingery

(10) Patent No.: US 12,120,462 B2
(45) Date of Patent: *Oct. 15, 2024

(54) MONITORING PROCESS

(71) Applicant: Offender Smartphone Monitoring, LLC, Montrose, CO (US)

(72) Inventor: Michael Hugh Kingery, Montrose, CO (US)

(73) Assignee: Offender Smartphone Monitoring, LLC, Montrose, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,601

(22) Filed: Jan. 28, 2022

(65) Prior Publication Data

US 2022/0159216 A1    May 19, 2022

Related U.S. Application Data

(63) Continuation of application No. 16/807,365, filed on Mar. 3, 2020, now Pat. No. 11,277,588, which is a
(Continued)

(51) Int. Cl.
*H01L 29/94*    (2006.01)
*G06V 40/70*    (2022.01)
(Continued)

(52) U.S. Cl.
CPC ............... *H04N 7/18* (2013.01); *G06V 40/70* (2022.01); *H04L 63/083* (2013.01);
(Continued)

(58) Field of Classification Search
CPC .......... H04N 7/18; H04N 7/181; G06V 40/70; H04L 63/083; H04L 63/0861; H04W 4/60; H04W 64/00
See application file for complete search history.

(56) References Cited

U.S. PATENT DOCUMENTS 4,843,377 A * 6/1989 Fuller .................... H04M 11/00
379/49
8,786,425 B1 * 7/2014 Hutz ...................... G08B 23/00
340/541
(Continued)

*Primary Examiner* — Joseph Suh
(74) *Attorney, Agent, or Firm* — Mark Whittenberger; Holland & Knight LLP

(57) ABSTRACT

A monitoring system includes at least one processor device and at least one memory architecture coupled with the at least one processor device. The monitoring system includes a first software module executable by the at least one processor and the at least one memory architecture, wherein the first software module is configured to monitor one or more sensor(s), wherein the one or more sensor(s) are configured to collect personally identifiable information, wherein the personally identifiable information pertains to a monitored individual and enables the monitored individual to be uniquely identified. The monitoring system also includes a second software module executed by the at least one processor and the at least one memory architecture, wherein the second software module is configured to enable a wireless transmitter to transmit a report on the monitored individual.

11 Claims, 18 Drawing Sheets

Related U.S. Application Data continuation of application No. 15/130,506, filed on Apr. 15, 2016, now Pat. No. 10,609,336.

(60) Provisional application No. 62/148,262, filed on Apr. 16, 2015.

(51) Int. Cl.
*H04L 9/40* (2022.01)
*H04N 7/18* (2006.01)
*H04W 4/60* (2018.01)
*H04W 64/00* (2009.01)

(52) U.S. Cl.
CPC ......... *H04L 63/0861* (2013.01); *H04N 7/181* (2013.01); *H04W 4/60* (2018.02); *H04W 64/00* (2013.01)

(56) References Cited

U.S. PATENT DOCUMENTS

| | | | | |
|---|---|---|---|---|
| 10,607,717 | B2* | 3/2020 | Staudt | C12Q 1/6886 |
| 2002/0029350 | A1* | 3/2002 | Cooper | H04L 63/0823 |
| | | | | 705/1.1 |
| 2007/0063853 | A1* | 3/2007 | Derrick | G08B 21/0288 |
| | | | | 340/573.4 |
| 2007/0144812 | A1* | 6/2007 | Stewart | B60K 28/063 |
| | | | | 307/10.6 |
| 2010/0131446 | A1* | 5/2010 | Firminger | G06N 5/04 |
| | | | | 706/46 |
| 2011/0032096 | A1* | 2/2011 | Miller | B60K 28/063 |
| | | | | 340/576 |
| 2011/0144455 | A1* | 6/2011 | Young | A61B 5/447 |
| | | | | 600/301 |
| 2012/0022890 | A1* | 1/2012 | Williams | G06Q 50/26 |
| | | | | 726/4 |
| 2012/0062879 | A1* | 3/2012 | Spennemann | A61B 5/0059 |
| | | | | 356/300 |
| 2012/0081282 | A1* | 4/2012 | Chin | G06F 3/011 |
| | | | | 345/156 |
| 2013/0035602 | A1* | 2/2013 | Gemer | G01N 33/4972 |
| | | | | 600/484 |
| 2013/0346148 | A1* | 12/2013 | Roth | G06Q 30/0201 |
| | | | | 705/7.29 |
| 2015/0061825 | A1* | 3/2015 | Suzuki | H04W 4/21 |
| | | | | 340/5.52 |
| 2015/0073907 | A1* | 3/2015 | Purves | G06Q 20/384 |
| | | | | 705/14.58 |
| 2015/0193739 | A1* | 7/2015 | Min | G06Q 10/06314 |
| | | | | 705/5 |
| 2015/0199502 | A1* | 7/2015 | Chen | G06F 21/32 |
| | | | | 705/325 |
| 2015/0371521 | A1* | 12/2015 | Braiman | G06K 7/10415 |
| | | | | 340/10.1 |
| 2015/0373104 | A1* | 12/2015 | Butler | G06F 16/21 |
| | | | | 707/610 |
| 2016/0012249 | A1* | 1/2016 | Keppler | G06F 16/955 |
| | | | | 726/28 |
| 2017/0318265 | A1* | 11/2017 | Lee | H04N 23/61 |

* cited by examiner

MONITORING PROCESS

RELATED CASES

This application is a continuation application of U.S. patent application Ser. No. 16/807,365, filed 3 Mar. 2020, entitled MONITORING PROCESS, which is a continuation application of U.S. patent application Ser. No. 15/130,506, filed on 15 Apr. 2016, entitled MONITORING PROCESS, now U.S. Pat. No. 10,609,336, issued on 31 Mar. 2020, which claims the benefit of U.S. Provisional Application No. 62/148,262 filed on 16 Apr. 2015, entitled SMARTPHONE MONITORING PROCESS, the contents of which are all incorporated by reference.

TECHNICAL FIELD

This disclosure relates to monitoring systems, and more particularly to the electronic supervision of high-risk individuals.

BACKGROUND

This section is intended to provide a discussion of the related art, and to facilitate an understanding of various technologies described herein. That such art is related in no way implies that it is prior art. It should therefore be understood that the statements in this section are to be read in this light, and not as admissions of prior art.

Electronic monitoring devices have long been used to monitor high-risk individuals, such as sex offenders, in some states. Some states have recently have included, and/or are considering including other high risk individuals such as, gang members, domestic abusers, Driving under the influence (DUI) offenders etc. These electronic monitoring devices have been application specific devices, such as ankle bracelets that require physically intruding on a subject's body around the clock, which some individuals contend may be an unconstitutional search under the Fourth Amendment. Further, these electronic monitoring devices also require regular charging, and thereby prolonged periods wherein the electronic monitoring device, and thereby the monitored individual, must be plugged into a wall outlet. A need therefore exists for a more efficient system of monitoring high-risk individuals.

BRIEF SUMMARY OF DISCLOSURE

In a first embodiment, a monitoring method includes monitoring one or more sensor(s), wherein the one or more sensor(s) are configured to collect personally identifiable information, wherein the personally identifiable information pertains to a monitored individual, and enables the monitored individual to be uniquely identified. The one or more sensor(s) include a Blood Alcohol Concentration (BAC) sensor. The monitoring, method also includes enabling a wireless transmitter to transmit a progress report on the monitored individual.

One or more of the following features may be included. The personally identifiable information may include biometric data, and the biometric may include one or more of a deoxyribonucleic (DNA) analysis, an earlobe geometry analysis, a facial recognition analysis, a fingerprint analysis, a hand geometry analysis, an eye patterns analysis, a signature analysis, and a voice waveform analysis. The one or more sensor(s) may include a camera, and the camera may be configured to capture a real-time image of the monitored individual, wherein the real-time image may be personally identifiable information. The monitoring method may also include comparing the real-time image of the monitored individual with a reference image of the monitored individual. The monitoring method may also include recording the real-time image of the monitored individual. The monitoring method may also include storing personally identifiable information. The progress report on the monitored individual may be periodically transmitted, randomly transmitted, transmitted based upon a sensor output or an alert, transmitted in response to a prompt from the monitoring network or at the initiation of the monitored individual. The monitoring method may also include generating a personal passcode. The monitoring method may also include prompting the monitored individual for the personal passcode. The monitoring method may also include determining the monitored individual's compliance with one or more monitored requirements, wherein the monitored requirements include one or more of an abstinence requirement, a curfew requirement, a probation requirement, compliance with a protection order, compliance with a court order, compliance with a self-medication requirement, compliance with one or more geographical constraints, attendance of one or more self-help meetings, attendance at one or more court hearings, attendance at one or more probation officer meetings, and one or more individual proximity restrains. The monitoring method may also include administering a reward system, wherein the reward system is configured to modify one or more reporting requirements by the monitored individual.

In another embodiment, a monitoring method includes monitoring one or more sensor(s), wherein the one or more sensor(s) are configured to collect personally identifiable information, wherein the personally identifiable information pertains to a monitored individual and enables the monitored individual to be uniquely identified. The personally identifiable information may include location data. The monitoring method also includes enabling a wireless transmitter to transmit a progress report on the monitored individual.

One or more of the following features may be included. The location data may include one or more of Global Positioning System (GPS) data, Wi-Fi access point identification information, cell phone tower identification information, wherein the location data is Assisted Global Positioning System (A-GPS) data. The one or more sensor(s) may include a camera, wherein the camera is configured to capture a real-time image of the monitored individual, wherein the real-time image is personally identifiable information. The method may also include comparing the real-time image of the monitored individual with a reference image of the monitored individual. The method may also include recording the real-time image of the monitored individual. The method may also include storing personally identifiable information. The progress report on the monitored individual may be periodically transmitted, randomly transmitted, transmitted based upon a sensor output or an alert, transmitted based upon a predefined schedule, transmitted in response to a prompt from a monitoring network or at the initiation of the monitored individual. The monitoring method may also include generating a personal passcode. The monitoring method may also include prompting the monitored individual for the personal passcode. The monitoring method may also include determining the monitored individual's compliance with one or more monitored requirements. The monitored requirements may include one or more of an abstinence requirement, a curfew requirement, a probation requirement, compliance with a protection order, compliance with a court order, compliance with a self-medication requirement, compliance with one or more geographical constraints, attendance of one or more self-help meetings, attendance at one or more court hearings, attendance at one or more probation officer meetings, and one or more individual proximity restrains. The method may also include administering a reward system, wherein the reward system is configured to modify one or more reporting requirements by the monitored individual.

In another embodiment, a monitoring system includes as least one processor device and at least one memory architecture coupled with the at least one processor device. The monitoring system includes a first software module executable by the at least one processor and the at least one memory architecture, wherein the first software module is configured to monitor one or more sensor(s), wherein the one or more sensor(s) are configured to collect personally identifiable information, wherein the personally identifiable information pertains to a monitored individual and enables the monitored individual to be uniquely identified. The monitoring system also includes a second software module executed by the at least one processor and the at least one memory architecture, wherein the second software module is configured to enable a wireless transmitter to transmit a report on the monitored individual.

One or more of the following features may be included. The personally identifiable information may include biometric data, and the biometric may include one or more of a DNA analysis, an earlobe geometry analysis, a facial recognition analysis, a fingerprint analysis, a hand geometry analysis, a iris and a retina patterns analysis, a signature analysis and a voice waveform analysis. The personally identifiable information may include location data, and the location data may include one or more of Global Positioning System (GPS) data, Wi-Fi access point identification information, cell phone tower identification information, wherein the location data is Assisted Global Positioning System (A-GPS) data. The one or more sensor(s) may include a camera, and the camera may be configured to capture a real-time image of the monitored individual, and the real-time image may be personally identifiable information. The monitoring system may also include a third software module executable by the at least one processor and the at least one memory architecture, wherein the third software module is configured to compare the real-time image of the monitored individual with a reference image of the monitored individual. The monitoring system may also include a fourth software module executable by the at least one memory architecture, wherein the fourth software module is configured to record the real-time image of the monitored individual. The monitoring system may also include a fifth software module executable by the at least one processor and the at least one memory architecture, wherein the fifth software module is configured to store personally identifiable information. The monitoring system may also include a sixth software module executable by the at least one memory architecture, wherein the sixth software module may be configured to determine the monitored individual's compliance with one or more monitored requirements, wherein the monitored requirements include one or more of an abstinence requirement, a curfew requirement, a probation requirement, compliance with a protection order, compliance with a court order, compliance with a self-medication requirement, compliance with one or more geographical constraints, attendance of one or more self-help meetings, attendance at one or more court hearings, attendance at one or more probation officer meetings, and one or more individual proximity restrains. The monitoring system may further include a wristlet tether, wherein the wristlet tether may include a Blood Alcohol Concentration (BAC) sensor. The BAC sensor may be a Near-Infrared Spectroscopy (NIRS) sensor. The monitoring system may further include a body temperature sensor. The wristlet tether may include a biosensor.

The details of one or more embodiments are set forth in the accompanying drawings and the description below. Other features and advantages will become apparent from the description, the drawings, and the claims.

BRIEF DESCRIPTION OF THE DRAWINGS

Embodiments of various techniques directed to a method, system, or apparatus relating to the monitoring of high-risk individuals, will hereafter be described with reference to the accompanying drawings. It should be understood, however, that the accompanying drawings illustrate only the various embodiments described herein, and are not meant to limit the scope of the various techniques described herein.

FIG. 9 is an illustrative diagrammatic view of a web based monitoring application summary page, according to one or more embodiments of the present disclosure;

FIG. 16 is an illustrative diagrammatic view of a monitoring application payment interface, according to one or more embodiments of the present disclosure;

Like reference symbols in the various drawings may indicate like elements.

DETAILED DESCRIPTION

System Overview

Reference will now be made in detail to the embodiments of the present disclosure, examples of which are illustrated in FIGS. 1-18. The present disclosure may, however, be implemented in many different forms and should not be construed as being limited to the embodiments set forth herein. Rather, these embodiments are provided so that this disclosure will be thorough and complete, and will fully convey the concept of the disclosure to those skilled in the art.

Figure 1:
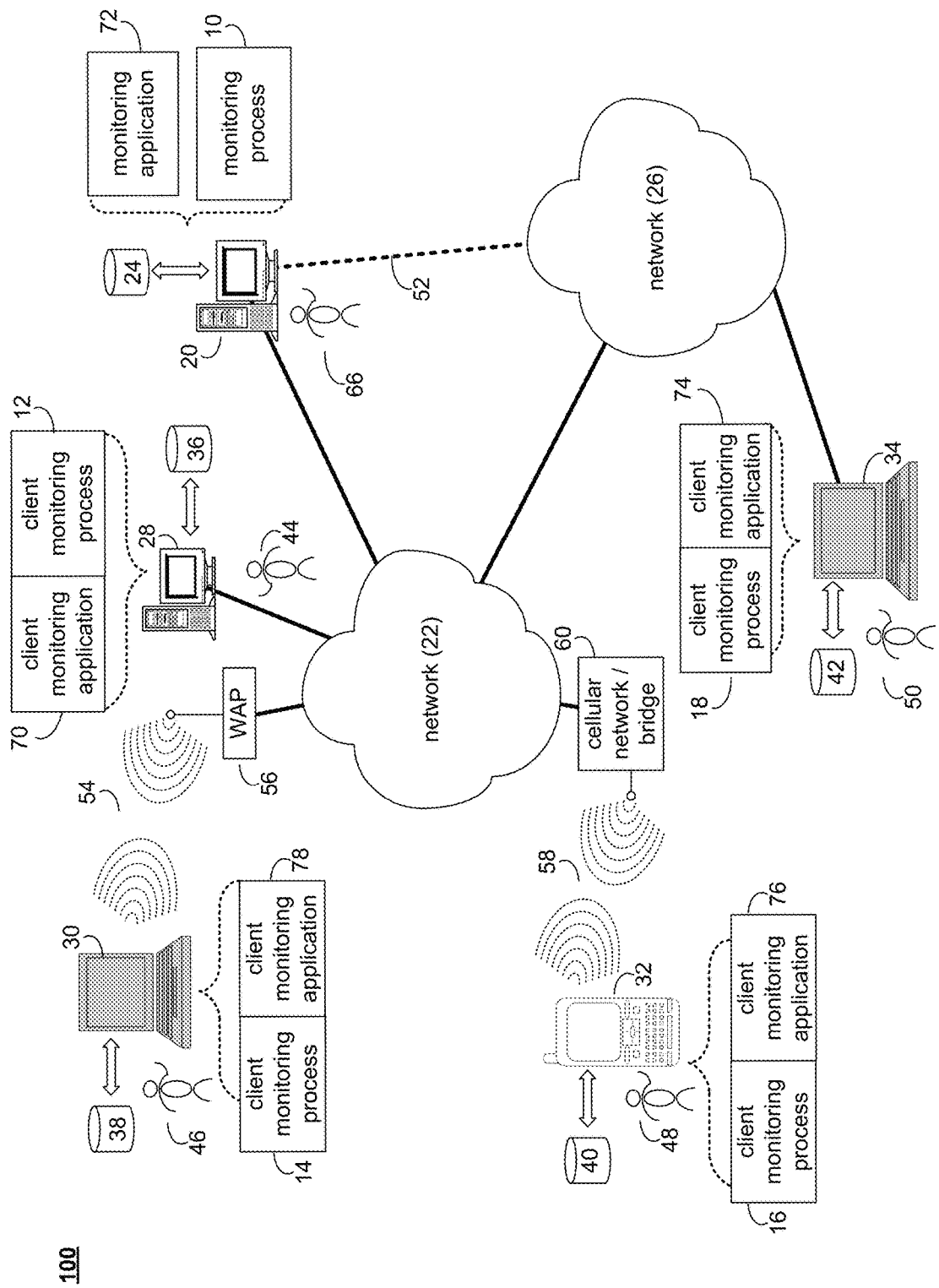
FIG. 1 is an illustrative diagrammatic view of a monitoring process coupled to a distributed computing network, according to one or more embodiments of the present disclosure.
Figure 18:
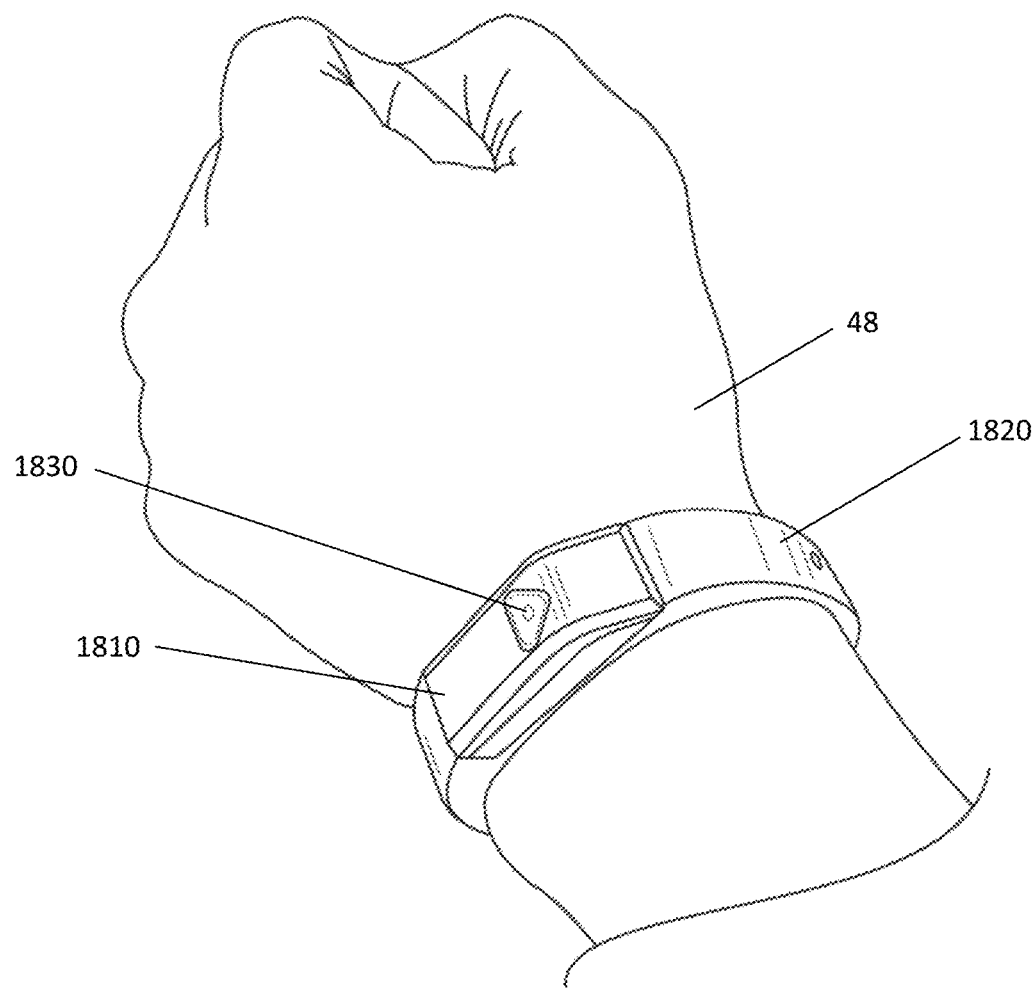
FIG. 18 is an illustrative diagrammatic view of a wristlet tether, according to one or more embodiments of the present disclosure.

Referring now to FIG. 1 and FIG. 18, there is shown a client monitoring process that may reside on and/or be executed by a microprocessor(s) (not shown) that may be executed by one or more client electronic devices (e.g., client electronic devices 28, 30, 32 and/or 34, respectfully). Examples of client electronic devices 28, 30, 32, and 34 may include, but are not limited to, a personal computer(s) 28, a notebook computer(s) 30, a smartphone(s) 32, a laptop computer(s) 34, and an application specific device(s) (not shown). The one or more client electronic devices 28, 30, 32 and/or 34 may be connected to a network 22, wherein the network 22 may be the internet or a local area network. Further, a server monitoring process 10 may reside, in whole or part, on server computer 20, which may be connected to network 22.

Embodiments of client monitoring process 16 may be configured to leverage smartphone 32 technology (e.g. Global Positioning System (GPS), smartphone audio/visual recordings etc.), and may include one or more downloadable applications, an application specific device or a physical wristlet tether 1800, cellular connectivity, and a web based monitoring system. Accordingly client monitoring process 16 may monitor and document a monitored individuals 48 compliance with court orders (e.g., abstinence, curfew, protective orders, court appearances, etc.).

Figure 2:
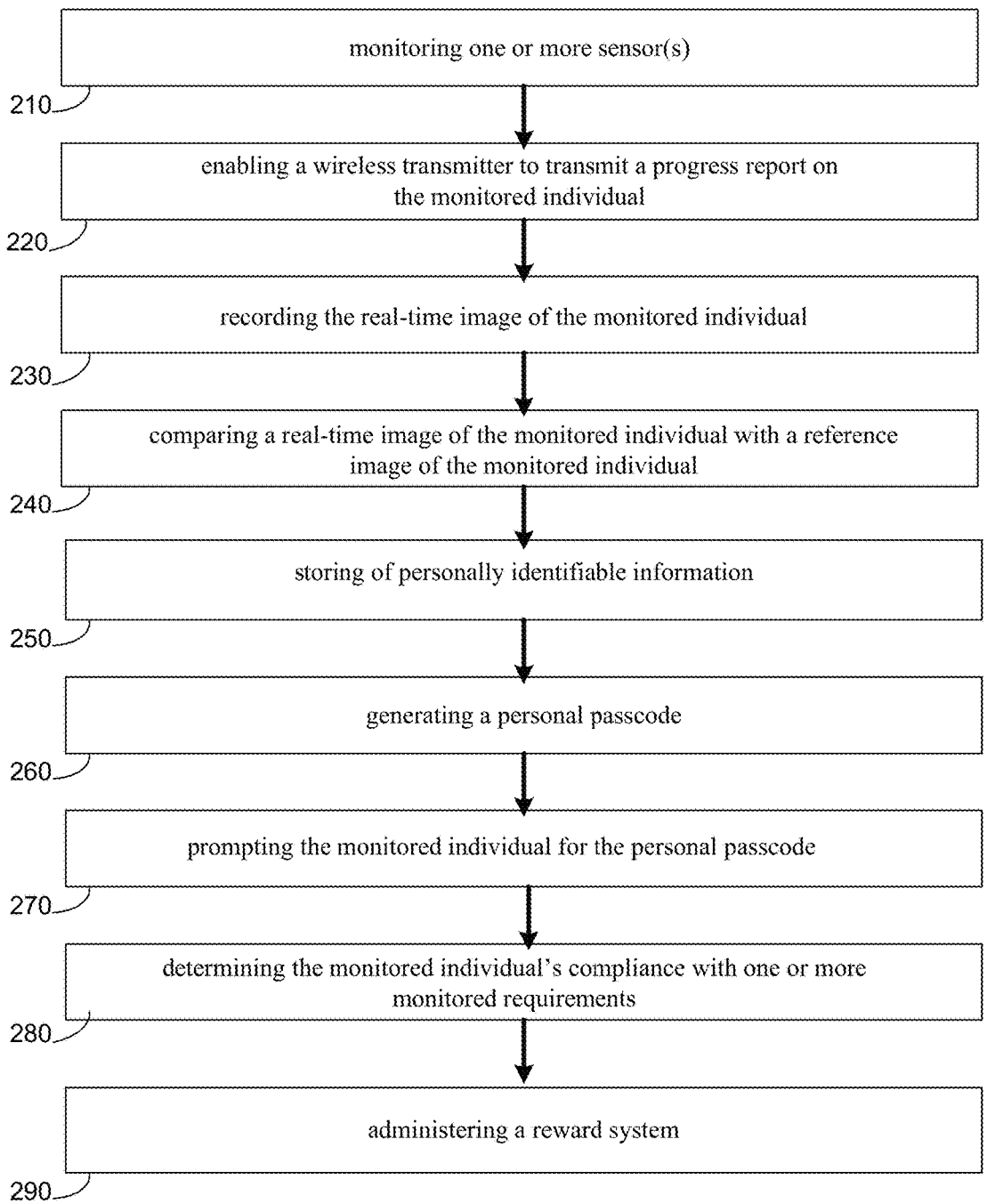
FIG. 2 is an illustrative flowchart of the monitoring process of FIG. 1, according to one or more embodiments of the present disclosure.

Referring now to FIGS. 1 and 2, while the client monitoring process 16 is depicted in FIG. 1, and throughout the disclosure as residing in whole or in part on a smartphone 32 this is intended to be for illustrative purposes only. The smartphone 32 may be any mobile computing device, wherein the mobile computing device may be a tablet, a phablet, smartwatch, or an application specific device, wherein the mobile computing device is capable of executing in whole or part the client monitoring process 16.

Further, while the client monitoring process 16, and thereby the server monitor process 10, is depicted in FIG. 1, and throughout the disclosure as being associated with the electronic supervision of high-risk individuals, and thereby by implication criminal offenders, this is intended to be for illustrative purposes only. The client monitoring process 16 may be utilized to monitor 210 any individual 48 that requires monitoring 210.

As will be discussed below in greater detail client monitoring process 16 may define the monitoring 210 of one or more sensor(s), the enabling 220 of a wireless transmitter, the recording 230 of a real-time image, the comparing 240 of the real-time image 710 with a reference image 720, the storing 250 of personally identifiable information, the generating 260 of a personal passcode 410, the prompting 270 of the monitored individual 48 for the personal passcode 410, the determining 280 of compliance with one or more monitored requirements, and the administration 290 of a reward system.

Referring again to FIG. 2, and now also to FIGS. 4, 5, 7, and 13, there is shown a flowchart for a method 200 for transmitting a progress report 1300 from a client monitoring application 76 to a monitoring application 72, wherein the progress report 1300 may be associated with a monitored individual 48. In some instances the progress report 1300 may include personally identifiable information, wherein the personally identifiable information enables the monitored individual 48 to be uniquely identified.

In some embodiments, the client monitoring application 76 may be executed by client monitoring process 16, and client monitoring process 16 may reside on, and may be executed by client device 32, wherein client device 32 is a smartphone 32. Client monitoring application 76 may be a standalone client monitoring application 76. The monitoring application 72 may be executed by server monitoring process 10, and server monitoring process 10 may reside on and may be executed by server computer 20. Server computer 20 may be one or more web servers, wherein the monitoring application 72 may be a web base application.

It should be understood that while method 200 indicates a particular order of execution of operations, in some instances, certain portions of the operations may be performed in a different order, and on different systems. Further, in some other instances, additional operations or steps may be added to method 200. Similarly, some operations or steps may be omitted from method 200.

In some embodiments, monitoring process 16 may include monitoring 210 one or more sensor(s), wherein the one or more sensors are configured to collect personally identifiable information pertaining to the monitored individual 48. The personally identifiable information may include biometric data and/or location data. For example, the biometric data may include one or more of a DNA analysis, an earlobe geometry analysis, a facial recognition analysis, a fingerprint analysis, a hand geometry analysis, an eye patterns analysis, a signature analysis and a voice waveform analysis. For example, the location data may include one more of Global Positioning System (GPS) data, Wi-Fi access point identification information, cell phone tower identification information, wherein the location data is Assisted Global Positioning System (A-GPS) data. The personally identifiable information pertaining to monitored individual 48 may enable the monitored individual 48 and/or his location to be uniquely identified. The one or more sensor(s) may further include a Blood Alcohol Concentration (BAC) sensor, wherein the BAC sensor may measure the persistence of ethanol in the blood and/or breath of the monitored individual 48.

In some embodiments, monitoring process 16 may include enabling 220 a wireless transmitter to transmit a progress report 1300 on the monitored individual 48. For example, the progress report 1300 may be transmitted from the smartphone 32 to monitoring application 72. The progress report 1300 may be periodically transmitted, randomly transmitted, transmitted based upon a sensor output or an alert, transmitted based upon a predefined schedule, or in response to a prompt from the monitoring network 22 and/or 26, or at the initiation of the monitored individual 48.

In some embodiments, monitoring process 16 may include recording 230 a real-time image 710 of the monitored individual 48. The recording 230 may be transmitted in real-time to a monitoring network 22 and/or 26, associated with the monitoring application 72. The client monitoring process 16 may utilize one or more camera(s) of the smartphone 32 to record 230 the real-time image 710 of the monitored individual 48.

In some embodiments, monitoring process 16 may include comparing 240 with a reference image 720 of the monitored individual 48. The real-time image 710 may be used to uniquely identify the monitored individual 48 and/or confirm that the monitored individual 48 is performing a required task, for instance a breathalyzer test. In some instances, the comparison 240 may be done by one or more supervisors 66 and/or the comparison 240 may be done by one or more software analysis programs. The one or more software analysis programs may be part of the client monitoring application 16 and/or part of the monitoring application 72, wherein monitoring application 72 is a web based monitoring application.

In some embodiments, monitoring process 16 may include storing 250 personally identifiable information. The personally identifiable information may be stored 250 locally on the smartphone storage device 40. The stored 250 personally identifiable information may be stored 250 for future reference and/or later complied into one or more progress reports 1300, and transmitted to the monitoring application 72.

In some embodiments, monitoring process 16 may include generating 260 a personal passcode 410. The personal passcode 410 may be generated 260 based, at least in part, upon one or more inputs from the monitored individual 48 and/or supervision 66. In some instances, the personal passcode 410 may be randomly generated 260.

In some embodiments, monitoring process 16 may include prompting 270 the monitored individual 48 for the personal passcode 410. The personal passcode 410 may be required to gain access to the client monitoring application 76, and may be used to restrict access to the client monitoring application 76, and thereby the monitored individual's 48 personally identifiable information.

In some embodiments, monitoring process 16 may include determining 280 the monitored individual's 48 compliance with one or more monitored requirements. As part of the client monitoring process 16 the monitored individual 48 may be required to satisfy one or more monitoring requirements. The monitoring requirements may include but are not limited to, an abstinence requirement, a curfew requirement, a probation requirement, compliance with a protection order, compliance with a court order, compliance with a self-medication requirement, and compliance with one or more geographical constraints. Further, the monitoring requirements may include attendance of one or more self-help meetings, attendance at one or more court hearings, attendance at one or more probation officer meetings. The monitoring requirements may include, one or more individual proximity restrains. In some instances, the monitoring requirements may pertain to the smartphone 32, For example, the monitored individual 48 may be required to periodically charge the smartphone 32 and/or maintain a minimum charge level.

In some embodiments, monitoring process 16 may include administering 290 a reward system. For example, compliance with one or more monitored requirements by the monitored individual 48 may result in one or more of the monitored requirements being modified and/or omitted. In some instances, compliance with one or more monitored requirements may result in the duration of the monitoring period 1310 being reduced. Further, the reward system may be configured to penalize the monitored individual 48 for non-compliance with one or more monitored requirements. For example, the reward system may make the one or more of the monitored requirements more stringent, may add additional monitoring requirements, may increase the periodicity of the check-ins 540, and/or may increase the duration of the monitoring period 1310.

Figure 3:
FIG. 3 is an illustrative diagrammatic view of a monitoring application, according to one or more embodiments of the present disclosure.

Referring now also to FIG. 3, there is shown an illustrative diagrammatic view of a client monitoring application 76. The client monitoring application 76 may have one or more symbols, 310-390, and/or icons associated with it, wherein the one or more symbols, 310-390, may represent the client monitoring application 76, and functionality which may be associated with the client monitoring process 16. For example, the client monitoring application 76 may be represented by the symbol 310 within a user interface of the smartphone 32. The symbol 310 may further have an alphanumeric character string 315 associated with it. For example, Outreach Smartphone Monitoring "OSM" or "OSM Now", wherein the alphanumeric string 315 may be a marketing name.

In some embodiments, functionality associated with the client monitoring process 16 may be represented by one or more symbols, 320-390 and/or icons, wherein the symbols 320-390 may act as visual prompts for that functionality. For example, the symbol 320 may be associated with a calendar within the client monitoring application 76, wherein the calendar includes one or more attendance requirements, for instance court appointments and/or probation officer meetings. The symbol 330 may be associated with the recording 230 of real-time images 710 of the monitored individual 48, which may have been recorded 230 by the client monitoring application 76. These real-time images 710 may have been recorded 230 for the purpose of uniquely identifying the monitored individual 48. The symbol 330 may be used to initiate a recording 230 of these real-time images 710. The symbol 340 may be associated with maps and/or one or more geographical constraints pertaining to the monitored individual 48. The symbol 350 may be associated with one or more progress reports 1300 pertaining to the monitored individual 48. The symbol 360 may be associated with one or more compliance reports and/or e-mail notifications pertaining to the monitored individual 48. The symbol 370 may be associated with connectivity. For instance, the client monitoring application 76 may be configured to connect to one or more external sensor(s), wherein the one or more external sensor(s) are used to collect personally identifiable information pertaining to the monitored individual 48. For example, symbol 370 may be used to connect to an external breathalyzer, wherein the external breathalyzer is configured to determine the monitored individuals 48 BAC. The symbol 380 may be associated with one or more monitoring requirements that the monitored individual 48 must comply with. For example, one or more courts orders, the attendance at one or more court hearings and/or probation officer meetings etc. The symbol 390 may be associated with one or more location services and/or resources. For example, one or more help lines, and the location of one or more shelters etc.

Figure 4:
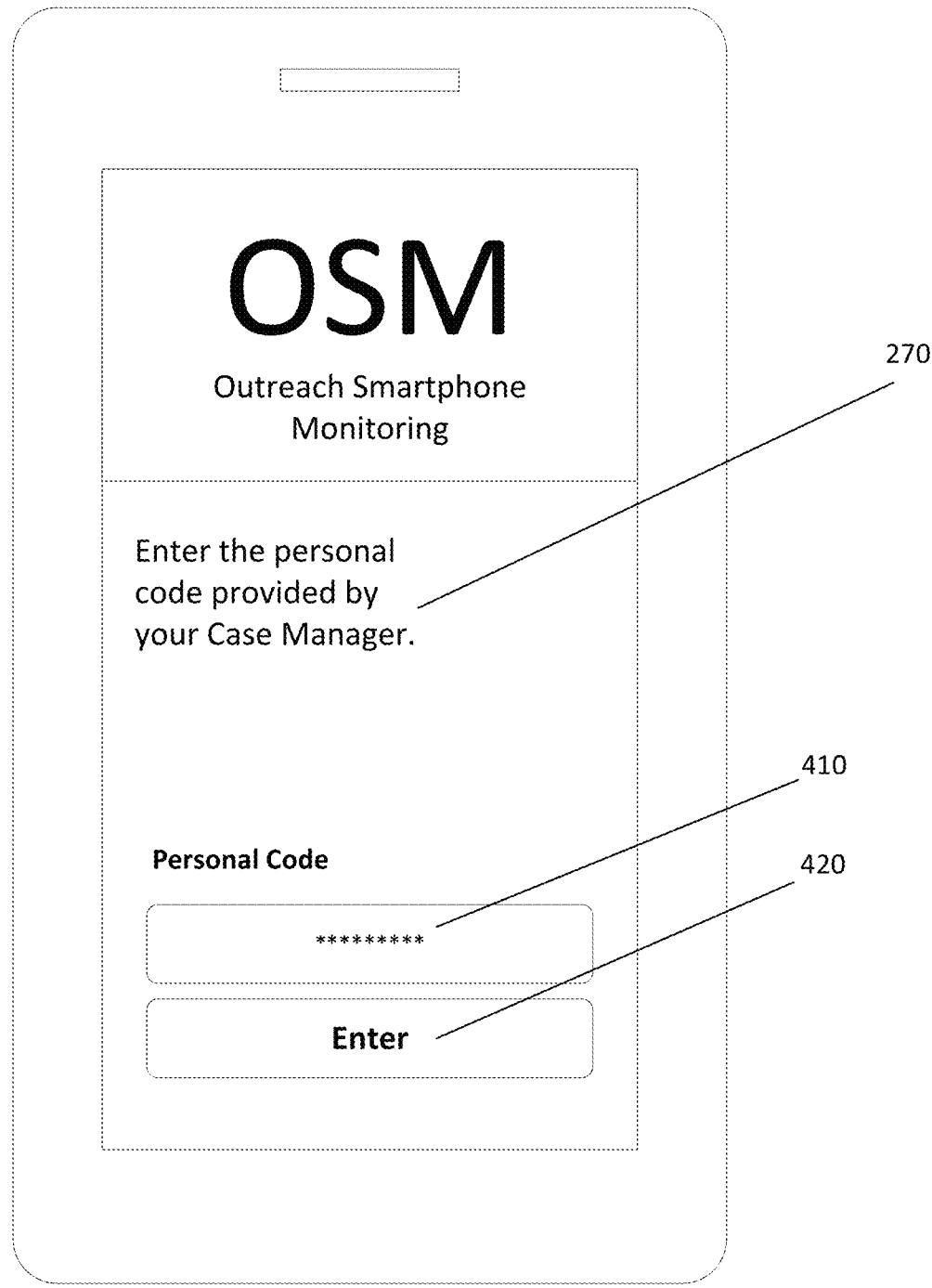
FIG. 4 is an illustrative diagrammatic view of a monitoring application passcode prompt interface, according to one or more embodiments of the present disclosure.
Figure 5:
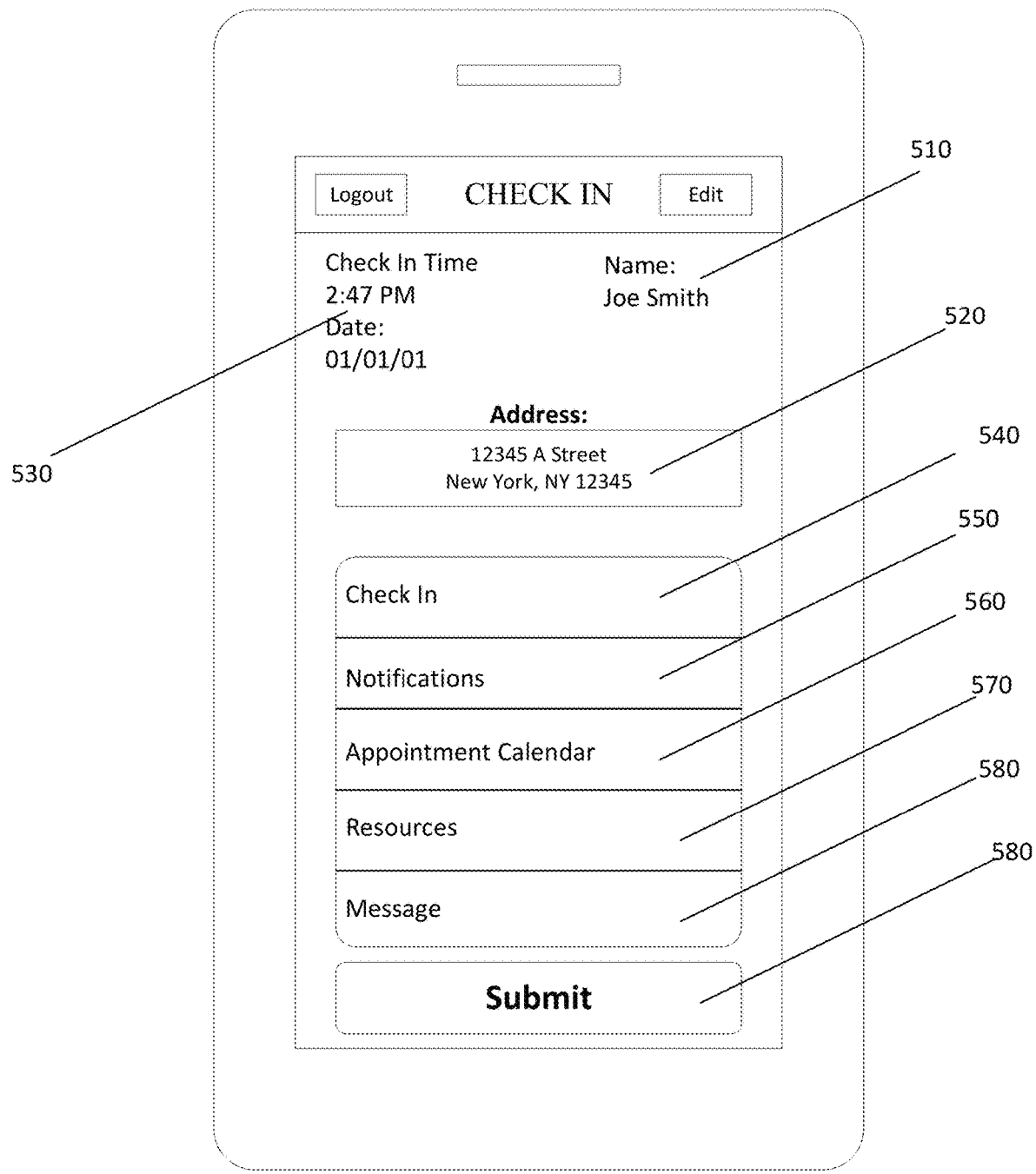
FIG. 5 is an illustrative diagrammatic view of monitoring application check-in interface, according to one or more embodiments of the present disclosure.

Referring again to FIG. 4, there is shown a diagrammatic view of a client monitoring application 76 passcode prompt interface 400. In FIG. 4 the passcode prompt interface 400 may permit the monitored individual 48 to type in a personal passcode 410 in response to a prompt 270 from the client monitoring application 76. The monitored individual 48 may then enter 420 the personal passcode 410 using a visual representation of an enter key 420. The prompt 270 may be displayed each time the monitored individual 48 accesses the client monitoring application 76, and may be used to restrict access to the client monitoring application 76, and thereby the monitored individual's 48 personal information. The client monitoring application 76 may include an auto-lock (not shown), wherein access to the client monitoring application 76 requires the personal passcode 410 to be reentered 420 after a set period of time has elapsed.

In some embodiments, the monitored individual 48 may be provided with the personal passcode 410 by a supervisor 66, wherein the supervisor 66 may be a probation officer 66 or case manager 66 assigned to supervise the monitored individual 48. The supervisor 66 may assign the monitored individual 48 with a personal passcode 410, wherein the personal passcode 410 is unique, and specific to each monitored individual 48. In some instances, the client monitoring application 76 may be configured to generate the personal passcode 410 based, at least in part, upon one or more inputs from the supervisor 66. For example, the supervisor 66 may use a supervisor passcode to generate the personal passcode 410. The client monitoring application 76 may be configured to generate the personal passcode 410 randomly. The client monitoring application 76 may be configured to generate the personal passcode 410 based, at least in part, one or more inputs from the monitored individual 48, wherein the client monitoring application 76 may be configured to generate the personal passcode 410 based on personally identifiable information pertaining to the monitored individual 48. For example, the personal passcode 410 may be based upon, at least in part, the monitored individuals 48 social security number 1220 and/or date or birth. In some instances, the personal passcode 410 may be generated by the monitoring application 72, and provided to the monitored individual 48 in one or more secure correspondences. For example, e-mails, SMSs., registered mail etc. The personal passcode 410 may further function as an electronic signature 410, wherein the personal passcode 410 may be used by the monitored individual 48 to authenticate and/or adopt the contents of one or more reports that are transmitted, and/or messages that the monitored individual 48 may compose. For example, the monitored individual 48 may be required to submit a statement explaining non-compliance with one or more monitored requirements, wherein the monitored individual 48 may be required to adopt the contents of the statement with an electronic signature 410.

Figure 16:
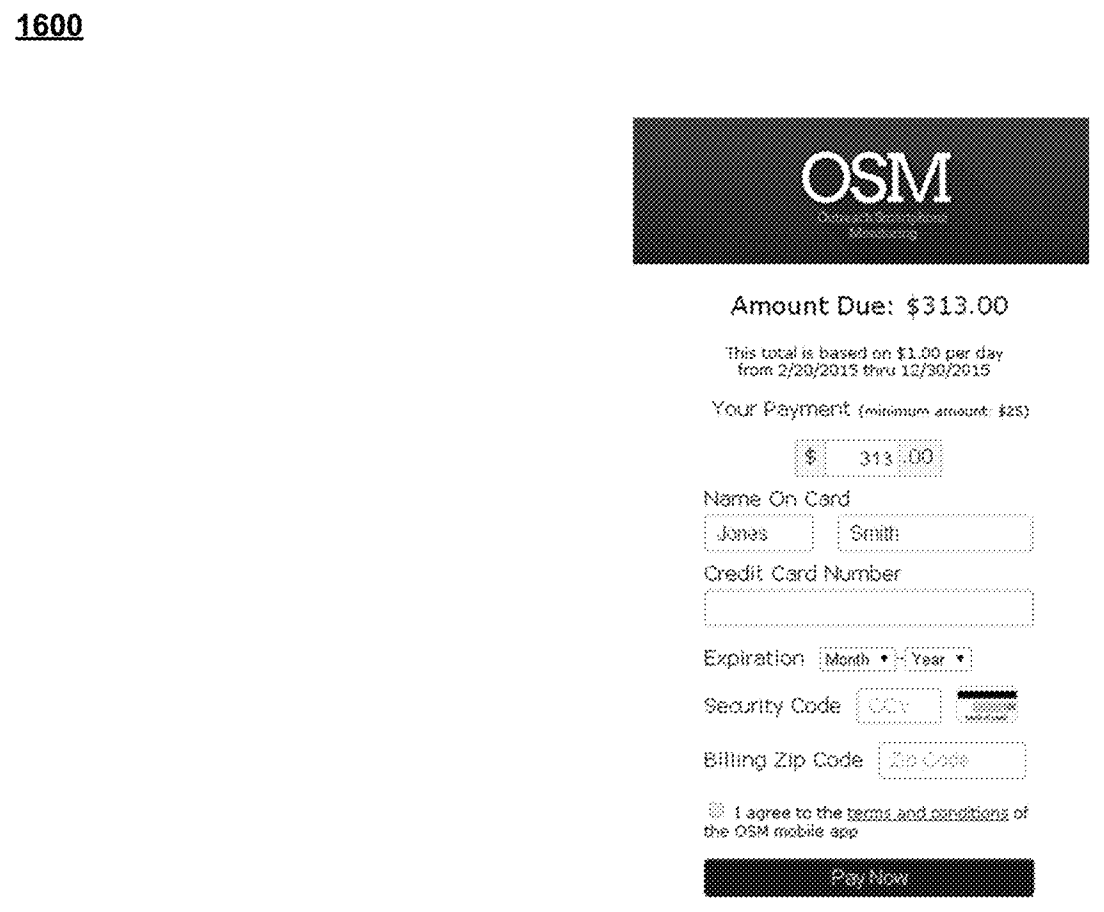

Referring again to FIG. 5, and now also to FIG. 16, there is shown a diagrammatic view of monitoring application check-in interface 500. The check-in interface 500 may display the monitored individual's 48 name 510, address 520 and details pertaining to a check-in 530. The client monitoring application 76 may be configured, wherein the address 520 corresponds to the monitored individuals 48 current address 520, as determine by location data and/or the monitored individuals 48 place of residence 520. The client monitoring application 76 may be configured, wherein the displayed check-in 530 may correspond to the last check-in 530 or the current check-in 530.

In some embodiments, the monitoring application check-in interface 500 may include one or more links 540-580 to other resources. For example, there may be a link 540, wherein the monitored individual 48 may initiate a check-in 530. There may be a link 550, wherein the monitored individual 48 may access one or more notifications. There may be a link 560 wherein the monitored individual 48 may access an appointment calendar 1600. There may be a link 570, wherein the monitored individual 48 may access one or more resources. There may be a link 580, wherein the monitored individual 48 may receive a message and/or compose a message that may be attached to a check-in report. Further, the monitoring application check-in interface 500 may include one or more visual representations of buttons 580, wherein the monitored individual 48 may submit a check-in report 530.

Figure 6:
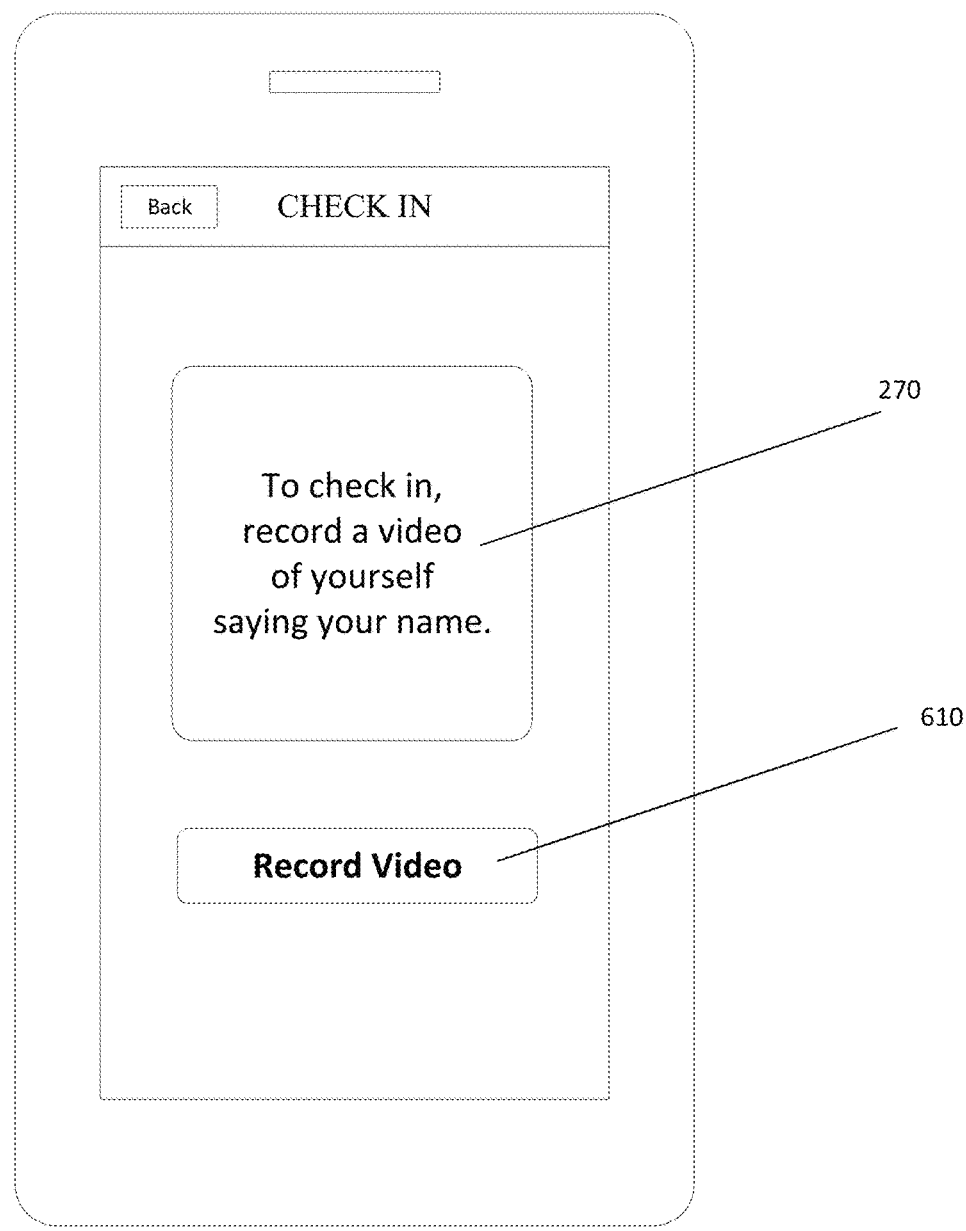
FIG. 6 is an illustrative diagrammatic view of monitoring application video check-in prompt, according to one or more embodiments of the present disclosure.

Referring now also to FIG. 6, there is shown a diagrammatic view of smartphone monitoring application video check-in prompt interface 600. The client monitoring application 76 may utilize one or more of the smartphone 32 sensor(s) to collect personally identifiable information pertaining to the monitored individual 48, wherein the personally identifiable information may enable the monitored individual 48 to be uniquely identified. For example, the smartphone 32 may include one or more camera(s), and the one or more camera(s) may be configured by the client monitor application 76 to capture a real-time image 710 of the monitored individual 48 The real-time image 710 may be a still image 710 and/or a video image 710 of the monitored individual 48. The one or more image(s) 710 may be time and/or date stamped. The still image 710 and the video image 710 may have different resolutions, and may be used for different purposes. For example, the still image 710 may have a higher resolution than the video image 710, and may be used to uniquely identify the monitored individual 48. The video image 710 may have a lower resolution than the still image 710, and may be used to confirm that an monitored individual 48 is performing a required task. For example, video image 710 may be used to confirm that the monitored individual 48 is performing a required task, such as a breathalyzer test, and/or saying an identifiable and distinguishable phrase, such as their name. In some instances the video image 710 may be used to uniquely identify the monitored individual 48.

Figure 7:
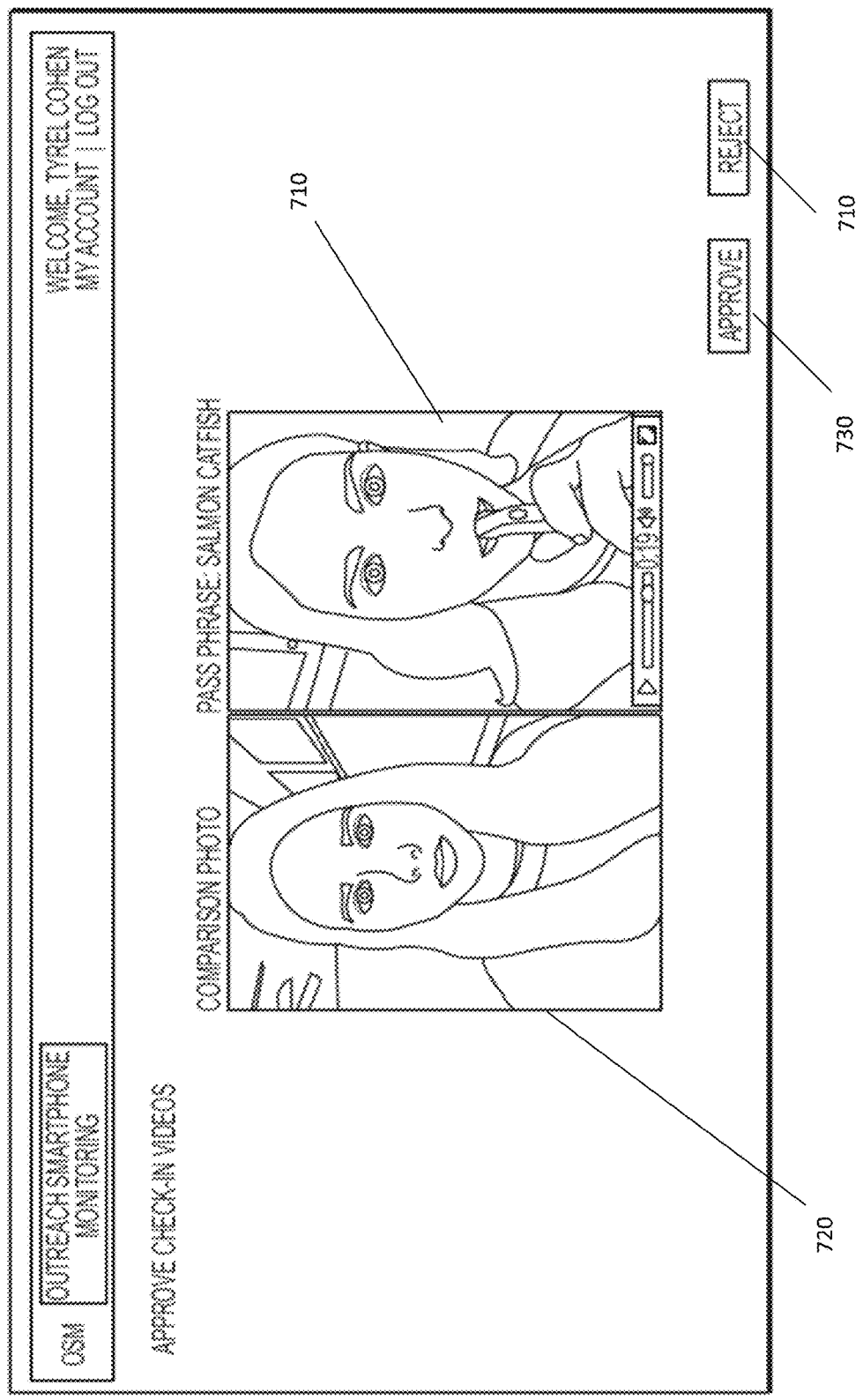
FIG. 7 is an illustrative diagrammatic view of a real-time image of the monitored individual compared to a reference image of the monitored individual, according to one or more embodiments of the present disclosure.

Referring again to FIG. 6, and now to FIG. 7, the monitored individual 48 may be presented with a visual check-in prompt 270 and/or audio prompt 270. For example, a visual prompt 270 may prompt 270 the monitored individual 48 to check-in 540, and may include instructions to perform one or more specific actions. For example, the monitored individual 48 may be instructed to record 230 a video of themselves performing a specific task, such as saying their name, taking a breathalyzer test etc. The video check-in prompt interface 600 may also include one or more visual representations of buttons 610 or other selectable options, wherein the buttons 610 are used by the monitored individual 48 to initiate the recording 230.

Referring again to FIG. 7, there is a shown a diagrammatic view of a real-time image 710 of the monitored individual 48 compared 240 to a reference image 720 of the monitored individual 48. The reference image 720 may be may be stored 250 locally 40 and/or remotely 24 at one or more storage locations. For instance, the reference image 720 may be stored 250 locally 40, and may be used to prompt 270 the monitored individual 48 as to the requirements of the real-time image 710 that is to be recorded 230. For example, the reference image 720 may be a facial portrait, and the may be used to inform the monitored individual 48 of the relative size of the real-time image 710 that is to be recorded 230. The reference image 720 may be some of, a generic profile image 720, a previously recorded 230 and stored 250 profile image 720 of the monitored individual 48, and a generic facial profile silhouette 720. The reference image 720 may be used to align, and resize the real-time image 710. For instance, the real-time image 710 may be superimposed upon the reference image 720, and recording 230 of the real-time image 710 may automatically begin when the real-time image 710, and the reference image 720 are substantially aligned. Alternatively the reference image 720 may be displayed adjacent to the real-time image 710, and used as a visual reference.

In some embodiments, the reference image 720 may enable the monitored individual 48 to be uniquely identified. For example, a supervisor 66 may compare 240 the real-time image 710 with the reference image 720 for the purpose of uniquely identifying the monitored individual 48. The supervisor 66 may have the option to approve the real-time image 710 using the button 730 or reject the real-time image 710 using button 740, wherein the approval may or may not be in real-time. In some instances, the comparison may be may be done by one or more software analysis programs. The one or more analysis programs may be part of the client monitoring process 16 and/or monitoring process 10, wherein monitoring process 10 may be a web based monitoring process.

Figure 8:
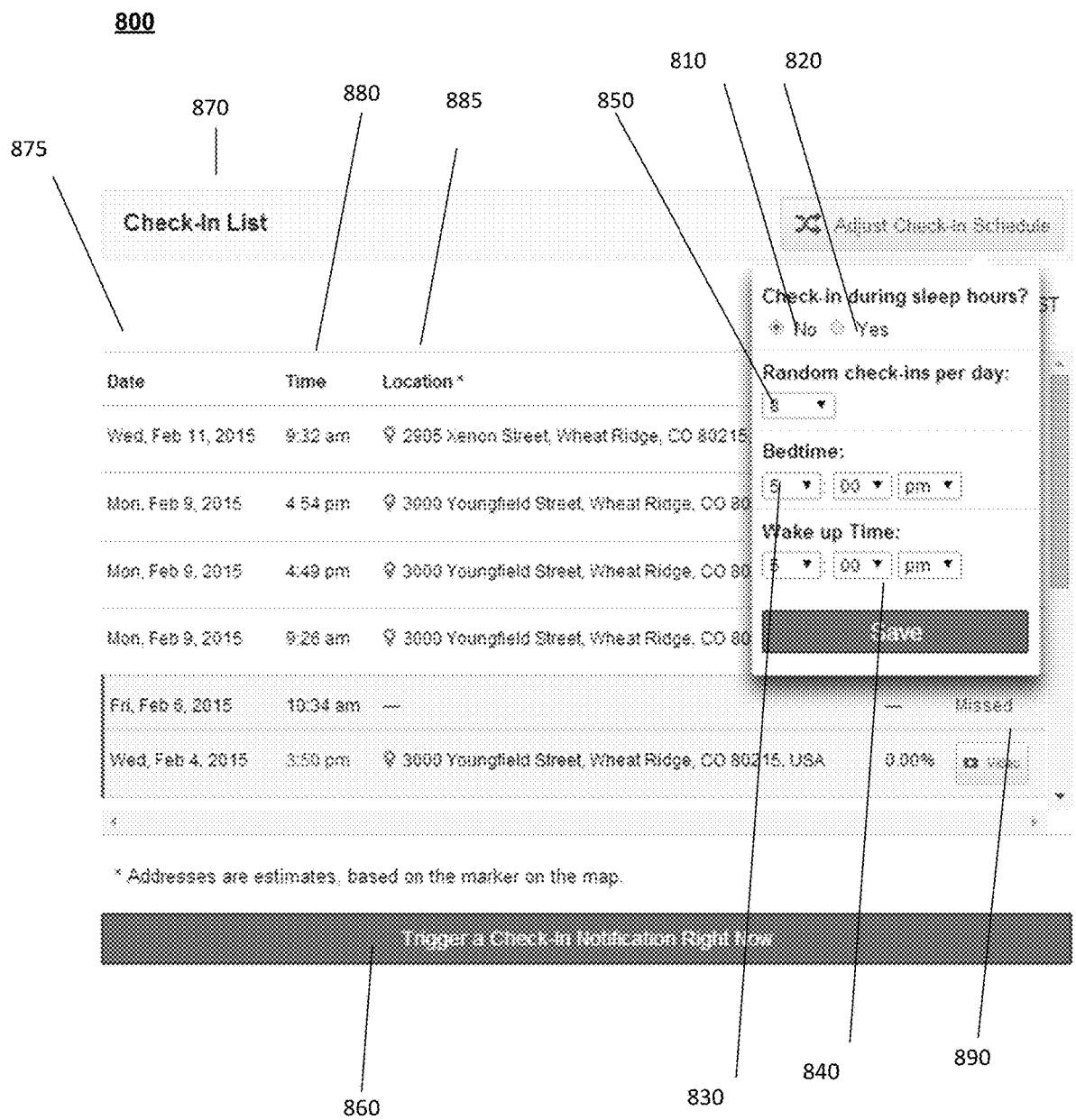
FIG. 8 is an illustrative diagrammatic view of a web based monitoring application check-in scheduler, according to one or more embodiments of the present disclosure.

Referring now also to FIG. 8, there is a shown a diagrammatic view of a monitoring application 72 check-in scheduler 800. The supervisor 66 may use the check-in scheduler 800 to schedule one or more check-ins 540 that the monitored individual 48 is required to complete. For example, monitored individual 48 may be required to periodically check-in 540, check-in 540 at random times, be prompted to check-in 540 based upon a sensor output or an alert, check-in 540 in response to a prompt from the supervisor 66 or combination thereof. The supervisor 66 may use the check-in scheduler 800 to specify whether the monitor individual 48 is required to check-in during sleep hours, by used of the buttons 810 and 820. The supervisor 66 may further define the sleep period through the use of fields 830 and 840 within the check-in scheduler 800 interface, wherein field 830 is used to define when the sleep period starts, and field 840 is used to define when the sleep period ends. The supervisor 66 may use field 850 to define the number of random check-ins 540 per day that the monitored individual 48 must comply with. Further, the supervisor 66 may use the field 860 to initiate a in real-time check-in 540.

In some embodiments, the check-in scheduler 800 may also include a summary report 870 corresponding to monitored individuals 48 check-ins 540. The summary report 870 may include a date field 875, a time field 880, a location field 885, and a status field 890, wherein the status field 890 indicates whether a check-in 540 was completed or missed by the monitored individual 48.

Figure 9:
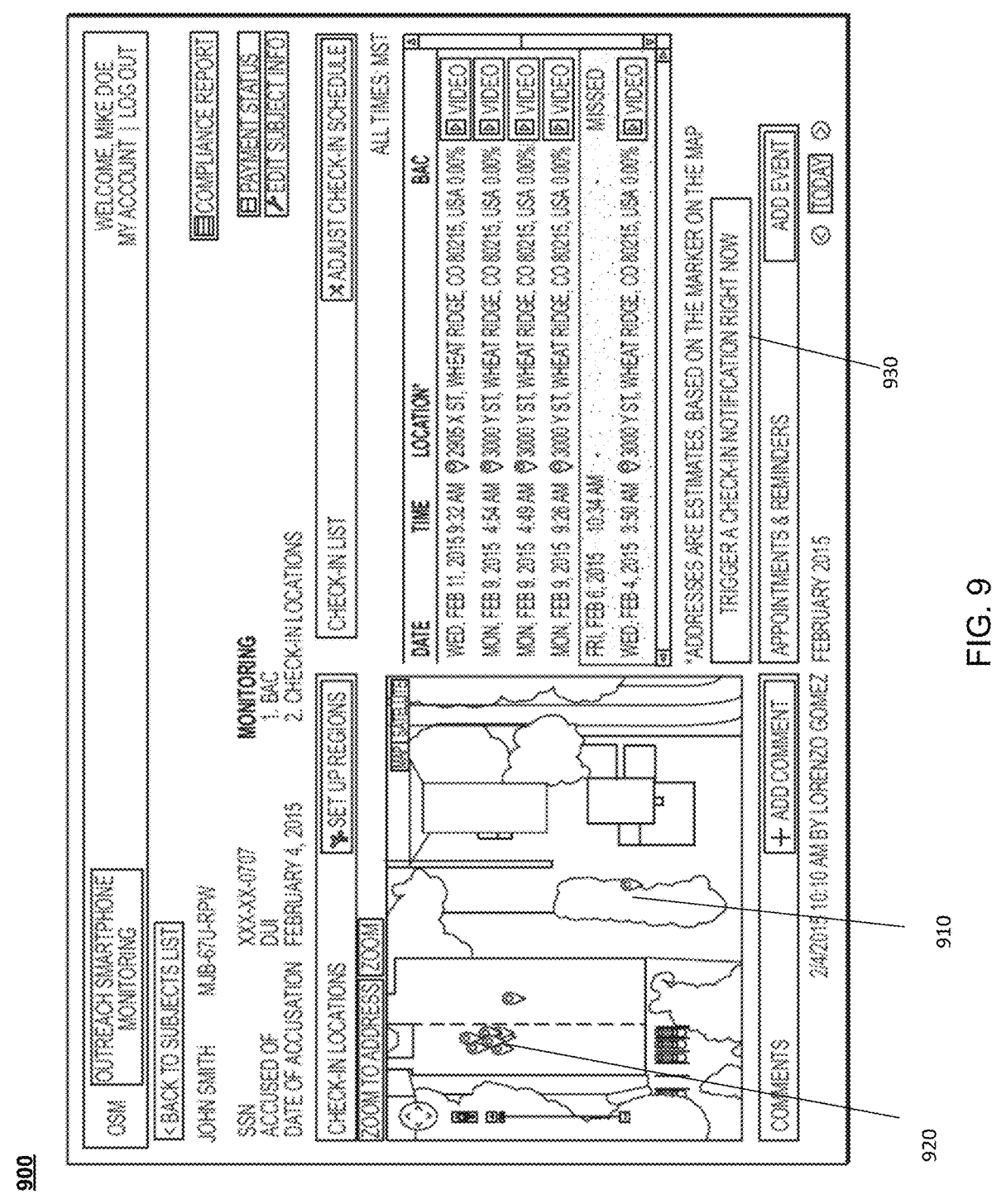

Referring now also to FIG. 9, there is a shown a diagrammatic view of web based monitoring application summary page 900. The web based monitoring application summary page 900 may include web based mapping information 910. The mapping information 910 may include some of, satellite imagery, street maps, 360° panoramic views of streets etc. The monitored individual's 48 individual check-ins 540 locations 920 may be depicted on the mapping information 910. The monitored individuals 48 location 920 may be displayed in real-time. The monitored individuals 48 current location 920 may be display in response to the supervisor 66 initiating a request via a button 930 to report the monitored individuals 48 current location 920, wherein the last know location 920 may be displayed if the current location 920 is unavailable.

Figure 10:
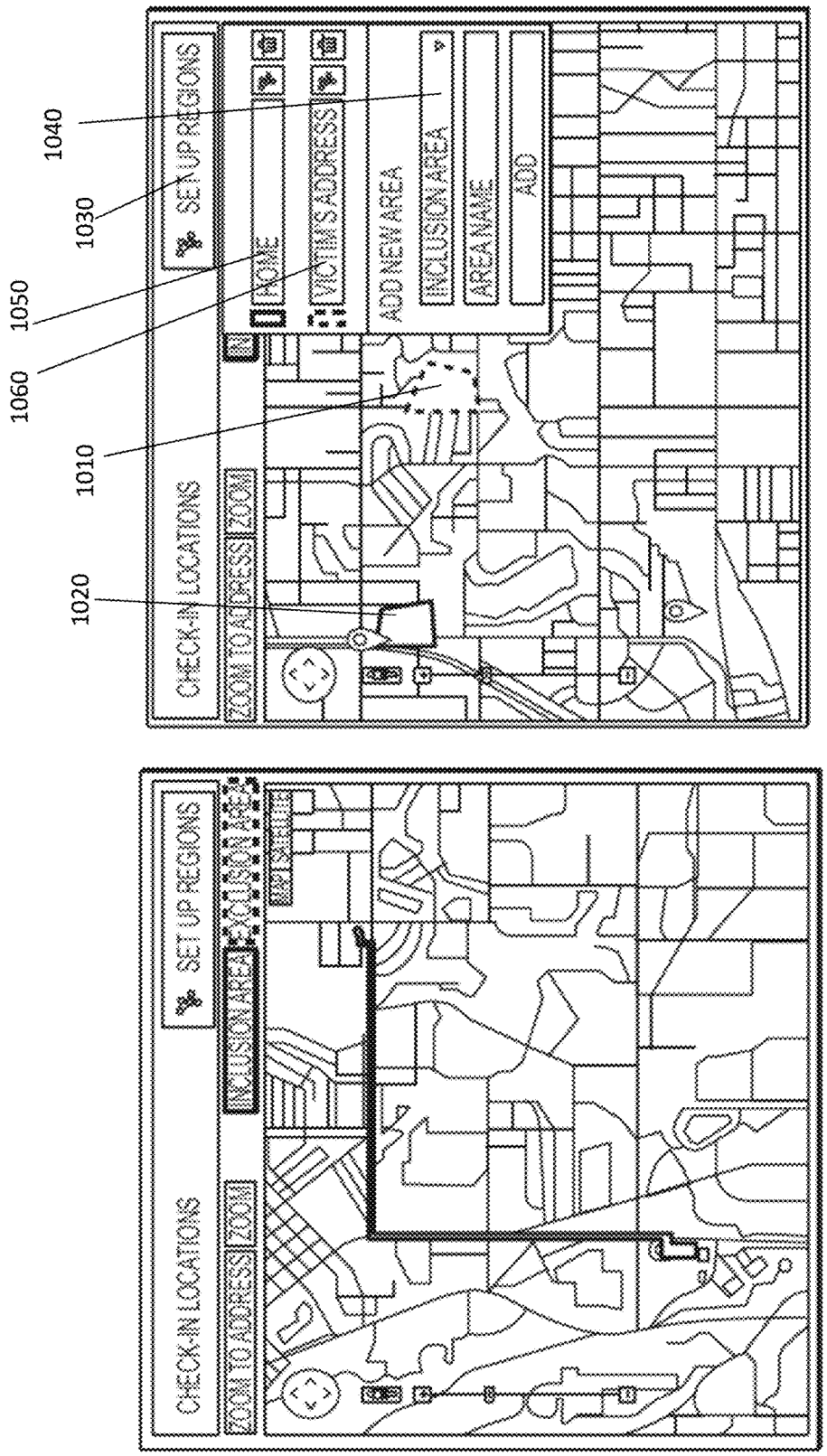
FIG. 10 is an illustrative diagrammatic view of a web based monitoring application geographical restriction scheduler page, according to one or more embodiments of the present disclosure.

Referring now also to FIG. 10, there is shown a diagrammatic view of a monitoring application 72 geographical restriction scheduler 1000. The supervisor 66 may use the geographical restriction scheduler 1000 to define one or more geographical restraints that the monitored individual 48 may be required to comply with. For instance, the monitored individual 48 may be a high risk individual, such as a registered sex offender, who may be subject one or more geographical restrictions, which may include his place of residence. Further, the monitored individual 48 may be restricted from living and/or entering geographical zones typically associated with children. The supervisor 66 may use the geographical restriction scheduler 1000 to define what geographical zones the monitored individual 48 is restricted 1010 from entering, and/or the supervisor 66 may use the geographical restriction scheduler 1000 to define the limits of one or more geographical zones that the monitored individual 48 should be confined 1020 to. For example, the supervisor 66 may define that the monitored individual 48 should be substantially confined to his place of residence, and his place work, wherein allowance may be made for the monitored individual 48 to commute between the two.

In some embodiments, the one or more geographical restrictions 1010 and/or 1020 may further vary based on the day and/or time of day. For example, the monitored individual 48 may be restricted 1010 from entering a geographical zone associated with his workplace outside of normal business hours. The monitored individual's 48 geographical restrictions 1010, 1020 may be synchronized with the monitored individual's calendar 1600, wherein the geographical restrictions 1010, 1020 may be modified in order that the monitored individual 48 may attend of one or more self-help meetings, court hearings, probation officer meetings etc. Other high risk individuals 48, such as domestic abusers 48, may not be allowed within a specified distance of one or more of the victims place of residence, place of work etc. Other high risk individuals 48, such as gang members 48, may not be allowed within a specified distance of locations associated know to be associated with gangs. Further, the monitoring application 72 may be tracking a plurality of high risk individuals 48. The monitoring application 72 may use this information to ensure that monitored individual 48 do not associated with other monitored individuals 48.

In some embodiments, an alert (not shown) may further be generated, wherein the alert notifies the supervisor 66 that the monitored individual 48 in violation of one or more geographic restrictions 1010, 1020, and/or associating with one or more other monitored individuals 48. The alert, may be based on the monitored individuals 48 current location, or based on an analysis of the monitored individuals 48 projected trajectory, wherein the analysis indicates that the monitored individual 48 will be in violation of one or more geographical restrictions 1010, 1020 and/or associating with one or more other high risk monitored individuals 48, at some point in the future.

In some embodiments, the supervisor 66 may further specify the one or more geographical restrictions 1010, 1020 via a graphical interface 1030. For example, the supervisor 66 may use a drop down menu 1040 within the graphical interface 1030 to specify whether a geographical area 910 is an exclusion area 1010 or inclusion area 1020. The supervision 66 may further use a drop down menu 1050 to select a geographical area 910 by type. For example, a victims place of residence, schools etc. Furthermore, the supervisor 66 may specify the geographical area 910 by entering a specific address 1060, and defining it as an restriction 1010 zone or a confinement 1020 zone.

In some embodiments, the supervisor 66 may further specify that the monitored individual 48 is not to be proximate to one or more specific monitored individuals (not shown) or all other monitored individuals (not shown). The supervisor 66 may use one or more pointers and a graphical display, to define one or more inclusion zones 1020 and/or exclusion zones 1010. For example, the supervisor 66 may define the zone using one or more of a mouse, stylist, touch screen etc.

In some embodiments, the monitored individuals 48 current location 910 and/or location data 910 may be determined by the client monitoring application 76, and transmitted to the monitoring application 72, as described herein. The location data 910 may be obtained from an integrated Global Positioning System (GPS) sensor (not shown), within the smartphone 32. The location data 910 may further be Assisted Global Positioning System (A-GPS) data 910, wherein GPS data is supplemented by Wi-Fi access point identification information and/or cell phone tower identification information.

Figure 11:
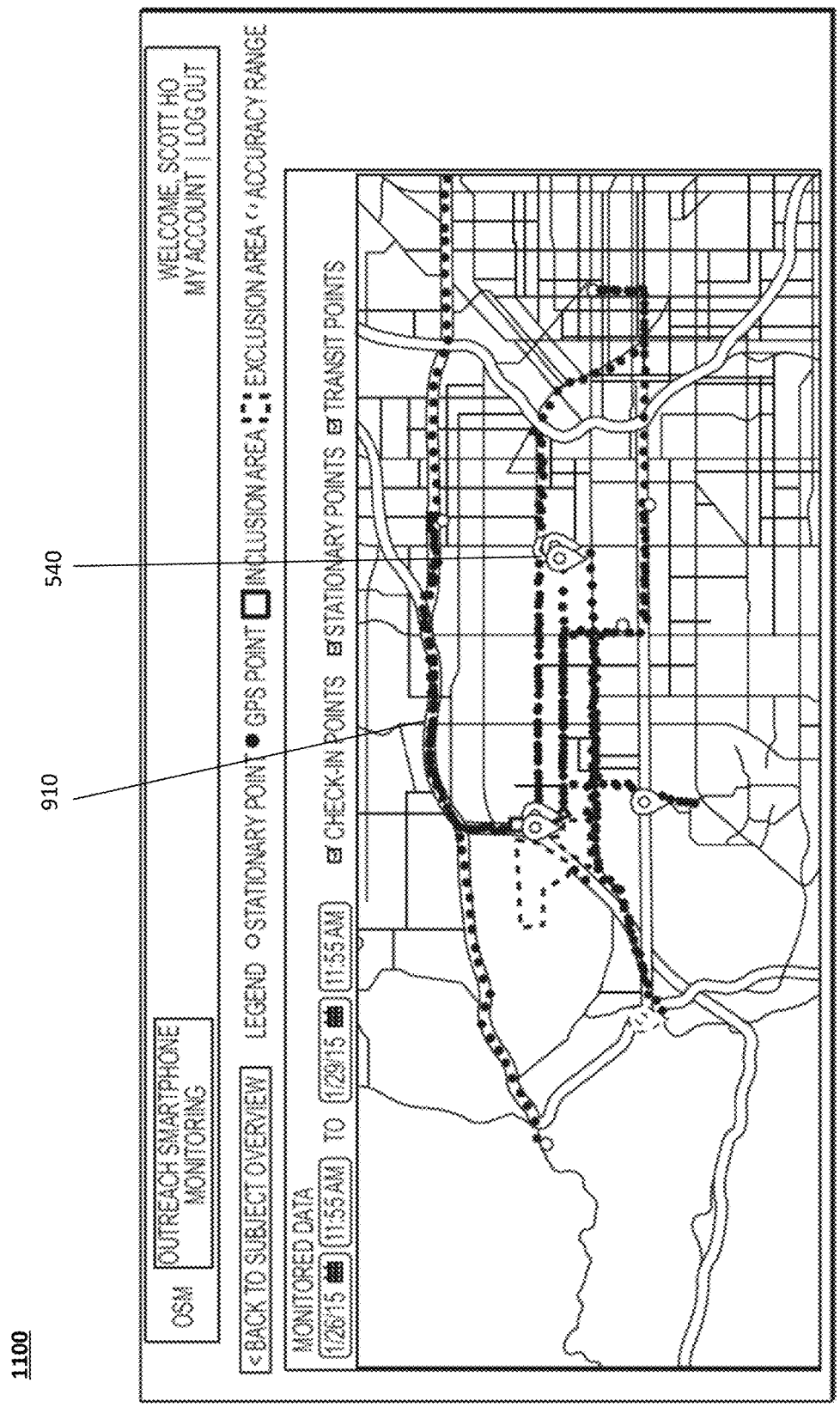
FIG. 11 is an illustrative diagrammatic view of a web based monitoring application geographical tracking summary page, according to one or more embodiments of the present disclosure.
Figure 13:
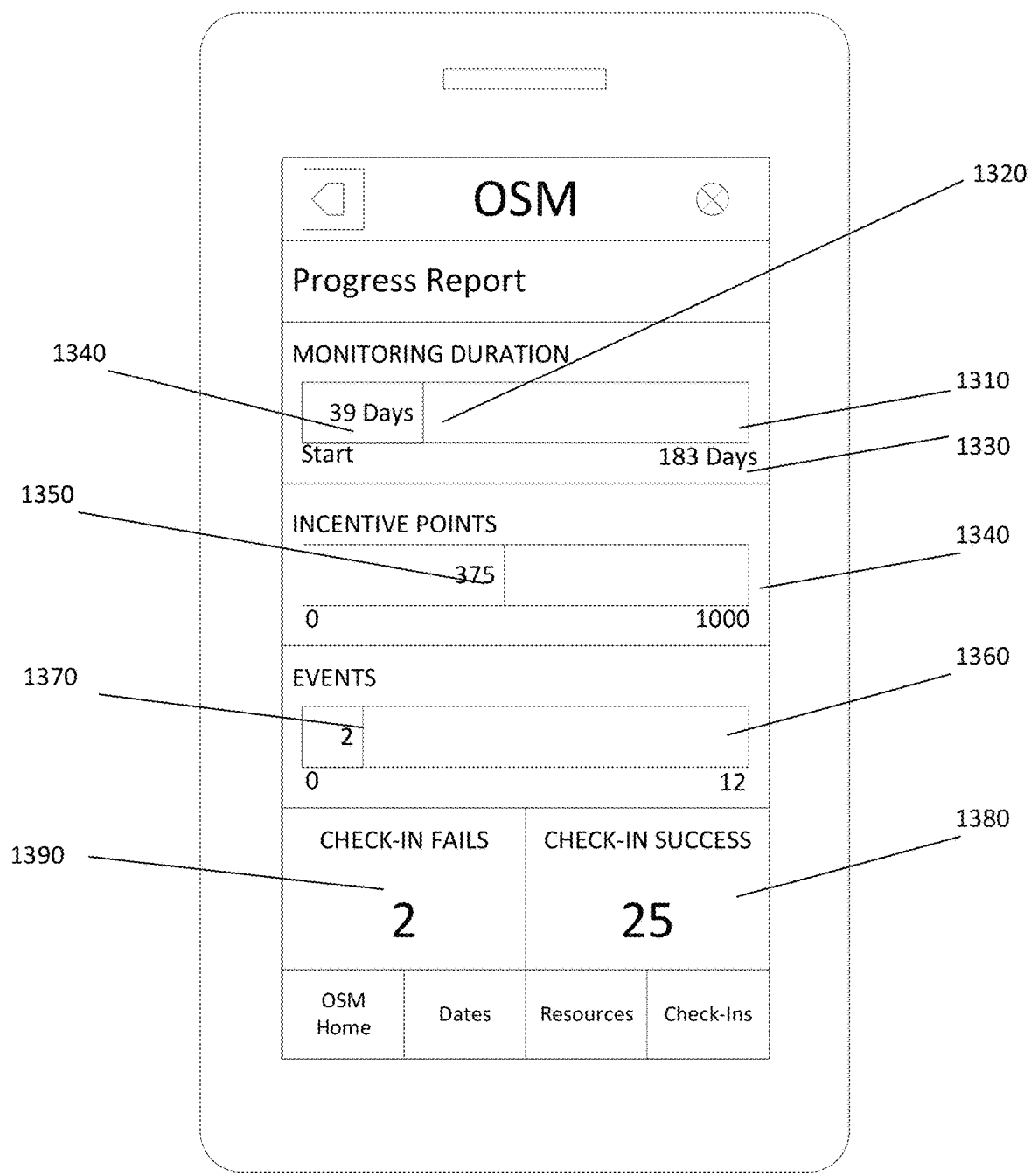
FIG. 13 is an illustrative diagrammatic view of a monitoring application progress report, according to one or more embodiments of the present disclosure.

Referring now also to FIGS. 11 and 13, there is shown a diagrammatic view of a web based monitoring application geographical tracking summary page 1100. The web based monitoring application tracking summary page 1100 may include a visual representation of the monitored individuals 48 one or more check-ins 540, and monitored locations 910, and thereby monitored routes 910 over a monitoring period 1310.

Figure 12:
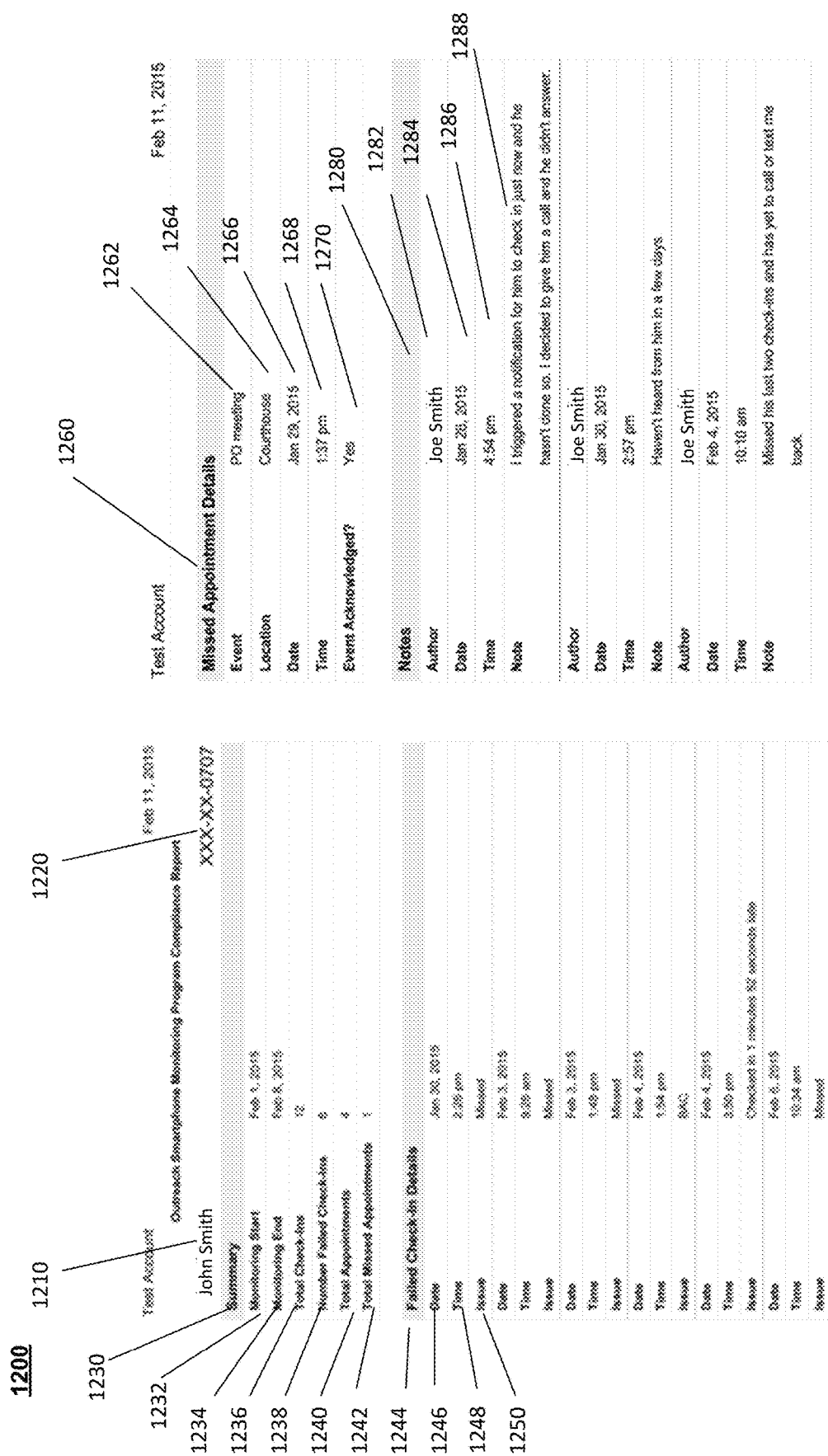
FIG. 12 is an illustrative diagrammatic view of a one or more geographical constraints associated with a monitoring application, according to one or more embodiments of the present disclosure.

Referring now also to FIG. 12, there is a shown a diagrammatic view of a web application compliance report 1200. The compliance report 1200 may be a detailed report of all of the monitored individual's 48 activity during a monitoring period 1310. The compliance report 1200 may include the monitored individual's name 1210, date of birth (not shown), and social security number 1220, wherein the social security number 1220 may be shown in whole or part. The compliance report 1200 may include a summary 1230, wherein the summary 1230 includes the monitoring start date 1232, and the monitoring stop date 1234, the total number of check-ins 1236, the number of failed check-ins 1238, the total number of appointments 1240, and the total number of missed appointments 1242.

In some embodiments, the compliance report 1200 may further include more detailed information 1244 pertaining to each of the failed check-ins 1238. For example, there may be six failed check-ins 1238 within the monitoring period 1310, and the detailed information 1244 pertaining to each of the failed check-ins 1238 may include the date 1246 of each failed check-in 1238, the time 1248 of each failed check-in 1238, and an a explanation 1250 for each of the failed check-ins 1238.

In some embodiments, the compliance report 1200 may furthermore include more detailed information 1260 pertaining to each of the missed appointments 1242. For example, there may be one missed appointment 1242, within the monitoring period 1310, and the detailed information 1260 pertaining to each of the missed appointments 1242 may include a description 1262 of the missed appointment 1242 or event 1242, the location 1264 of the event 1242, the date 1266 of the event 1242, the time 1268 of the event 1242 and whether the event 1242 was acknowledged 1270 by the monitored individual 48.

In some embodiments, the compliance report 1200 may include one or more notes 1280 or comments 1280, which the supervisor 66 may have added to the compliance report 1200. The notes 1280, may include the name 1282 of the author of the note 1280, which may be the supervisor 66, the date 1284 the comment was added, time 1286 the comment was added, and the actual comments 1288.

In some embodiments, the one or more comments 1288 may include actions that the supervisor 66 has initiated, and the monitored individuals 48 responses or lack thereof. The supervisor 66 may also include general comments 1288 pertaining to the monitored individual 48, within this comment field 1288. For example, whether the monitored individual 48 has missed check-ins 1268, and when was the last time that the supervisor 66 has heard from the monitored individual 48.

Referring again to FIG. 13, there is shown a diagrammatic view of client monitoring application 76 progress report 1300. The progress report 1300 may include one or more representations of the monitoring period 1310, and an visual indication of where the monitored individual 48 is within the monitoring period 1310. For instance, the monitoring duration to date 1320 may be represented by a monitoring duration to date status bar, wherein the monitoring duration to date status bar may be incrementally shaded as the monitoring duration to date 1320 progresses. There may further be an alphanumeric representation 1330 of the monitoring period 1310, and an alphanumeric representation 1340 of the monitoring duration to date 1320.

In some embodiments, the progress report 1300 may include one or more representations of the total number of incentives points 1340 associated with the monitoring period 1310, and an indication of the number of incentive points acquired within the monitoring period 1310. For instance, the total number of incentive points acquired to date 1350, may be represented by a status bar, wherein the total number of incentive points status bar may be incrementally shaded 1350 as incentive points are acquired.

In some embodiments, the progress report 1300 may include one or more representations of the total number of events 1360 associated with the total monitoring duration 1310, and an indication of the number of events 1370 attended to date. For instance, the total number of events 1360, may be represented by a total number of events status bar 1360, wherein the total number of events status bar 1360 may be incrementally shaded 1370 as events are attended.

In some embodiments, the progress report 1300 may include one or more representations of the total number of successful check-ins 1380 associated with the total monitoring period 1310, and/or the monitoring period to date 1320. The progress report 1300 may include one or more representations of the total number of unsuccessful check-ins 1390 associated with the total monitoring period 1310, and/or the monitoring period to date 1320.

In some embodiments, one or more, colors, symbols and icons may be associated with the progress report 1300. For instance, a status bar, and/or the incrimination of that status bar, may be associated with one or more colors. For example, a status bar may be associated with the color green, wherein the status bar is progressively shade green as it is incremented. In another example, successful check-ins 1380 may be associated with the color green, while unsuccessful check-ins 1390 may be associated with the color red.

Figure 14:
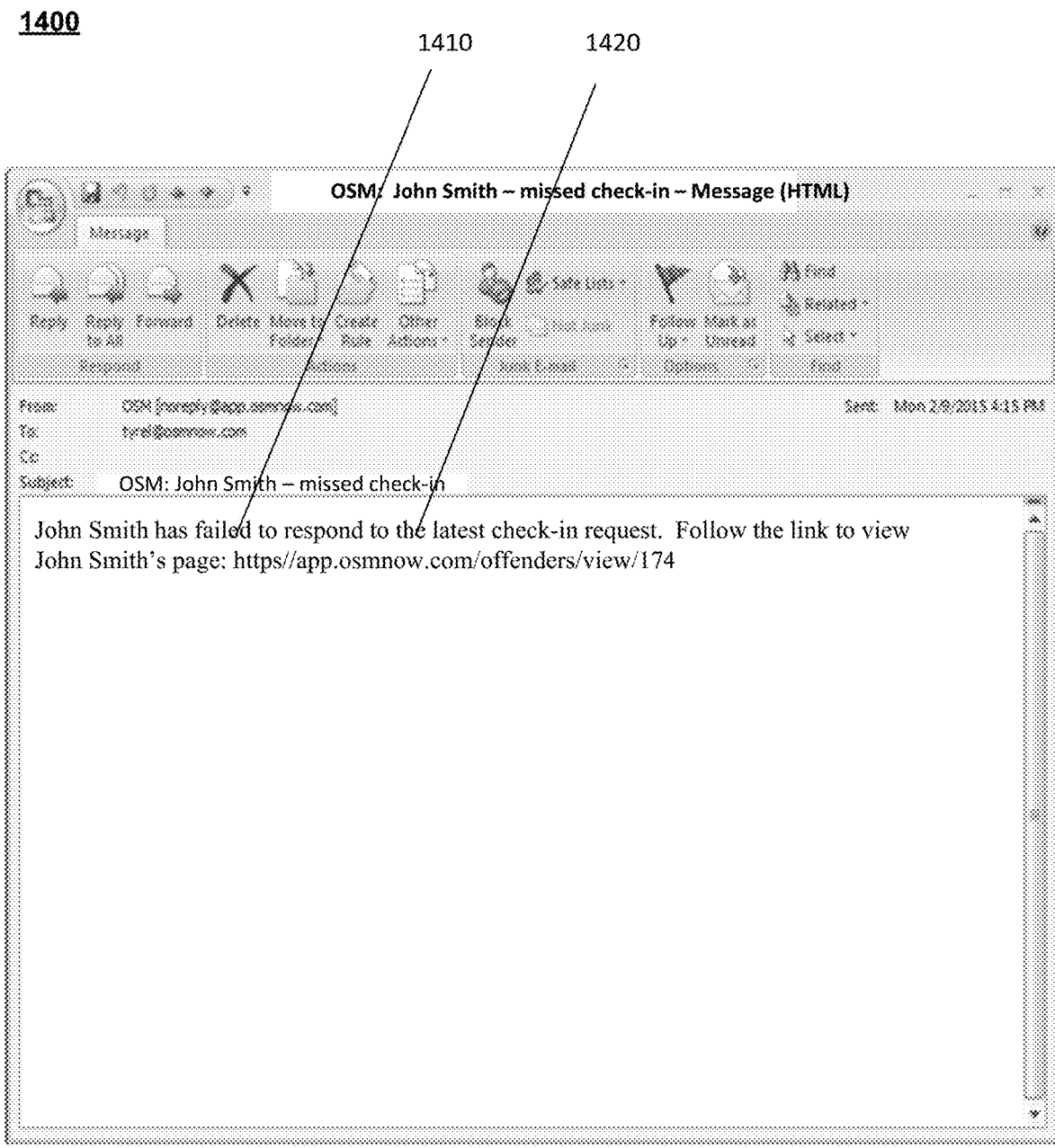
FIG. 14 is an illustrative diagrammatic view of a monitoring application violation email report, according to one or more embodiments of the present disclosure.

Referring now also to FIG. 14, there is a shown a diagrammatic view of a client monitoring application 76 violation email report 1400. A violation email report 1400 may be generated by the client monitoring application 76 and/or web monitoring application 72 if it is determined that the monitored individual 48 in not in compliance with one or more monitored requirements. The violation email report 1400 may include a summary 1410 of the specific violation. Further, the violation email report 1400 may further include a link 1420 to a web page 1200 pertaining to the monitored individual 48, wherein the web page 1200 may be the compliance report 1200.

In some embodiments, the violation email report 1400 may be sent in real-time, thereby enabling the supervisor 66 and/or monitoring application 72 to be notified of the violation in real-time. In some instances, the violation report 1400 may be analyzed to determine the severity of the violation. For example, the supervisor 66 may elect to be notified outside of regular working hours only of serious violations, wherein the violation report 1400 would otherwise be stored for further retrieval. In some embodiments, the monitored individual 48 may have the option to add comments (not shown) to the violation email report 1400, wherein the comments may clarify why the violation occurred. For example, failure to check-in 1390 by the monitored individual 48 because of poor cell phone coverage.

Figure 15:
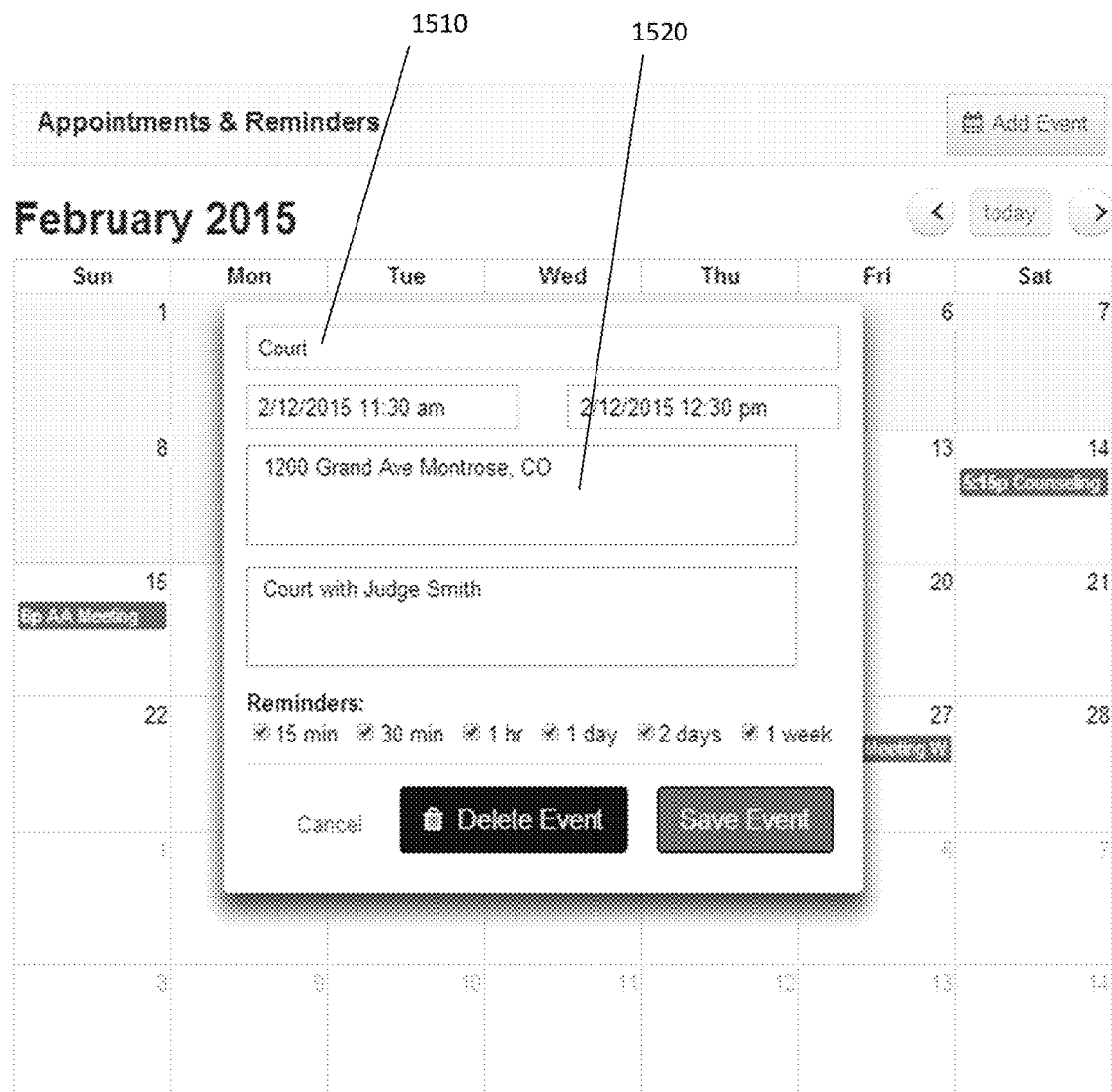
FIG. 15 is an illustrative diagrammatic view of a monitoring calendar interface, according to one or more embodiments of the present disclosure.

Referring now also to FIG. 15, there is a shown a diagrammatic view of a smartphone monitoring application calendar interface 1500. The calendar interface 1500 may be used to notify the monitored individual 48 of one or more meetings 1510 that the monitored individual 48 may be required to comply with. For example, the monitored individual 48 may be required to attend one or more of, self-help meetings, court hearings, probation officer meeting, drug tests etc. The monitoring application 76 may be configured to push notifications 1520 to the monitored individual 48, wherein the push notifications 1520 may be automatically generated by the client monitoring application 76. The number of push notifications 1520 may be configured by the monitored individual 48, his supervisor 66 or automatically generated. The number of push notifications 1520 associated with each calendar entry may be configured up to a specified maximum. For example, the maximum number of push notifications may be configured to be six. In some instances the calendar interface 1500 may be associated with the monitoring application 72 and/or the client monitoring application 76.

Referring again to FIG. 16, there is shown a diagrammatic view of client monitoring application 76 payment interface 1600 or payment portal 1600. The payment interface 1600 may be used to enter payment information associated with use of the client monitoring application 76 by the monitored individual 48. For example, the client monitoring process 16 may be provided as a service by a $3^{rd}$ party, wherein the monitored individual 48 may pay the $3^{rd}$ party for the privilege of using the service, and benefits associated with that service. These benefits may include, but are not limited to, not being tethered to a physical device, such as an ankle bracelet, which may require the monitored individual 48 to be situated near a wall outlet for prolonged periods each day to recharge the ankle bracelet.

In some embodiments, the client monitoring process 16 may further be administered by one or more state and federal administrative agencies and/or private organizations, and these payments may cover the costs associated providing the service in whole or part. For example, there may be costs associated with providing one or more supervisors 66, the server computer 20, and may further include the cost of providing the smartphone 32 and/or any associated wireless data plans.

Figure 17:
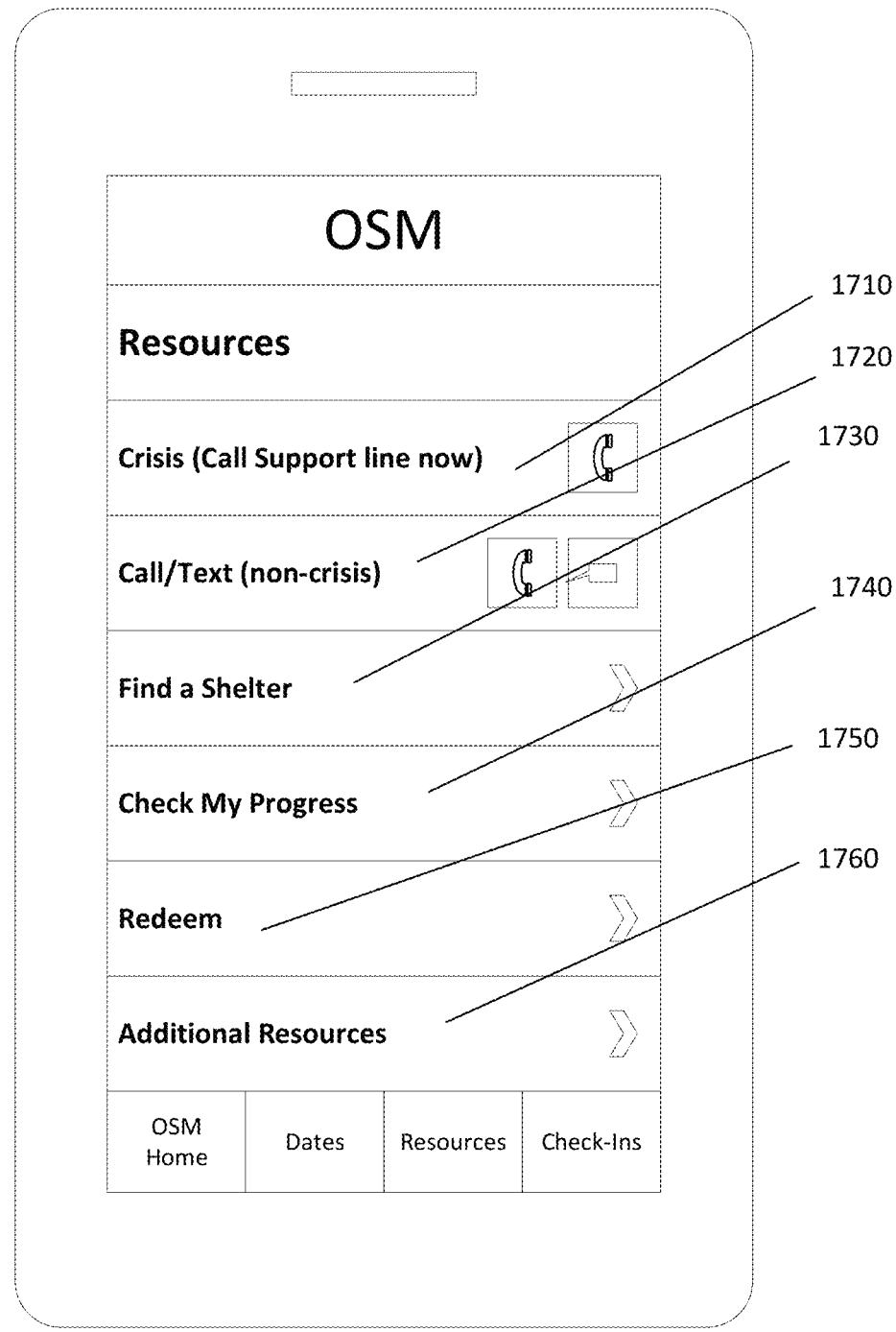
FIG. 17 is an illustrative diagrammatic view of a monitoring application location and resource interface, according to one or more embodiments of the present disclosure.

Referring now also to FIG. 17, there is shown a diagrammatic view of a client monitoring application 76 location and resource interface 1700. The location and resource interface 1700 may be associated with one or more location services and/or resources. For example, the location and resource interface 1700 may include a link 1710 for a crisis support center, wherein the monitored individual 48 may call the crisis support center using the link 1710. The location and resource interface 1700 may include a link 1720, wherein the monitored individual 48 may call a non-crisis related individual using the link 1720. For example, the link 1720 may be associated with a sponsor, wherein the sponsor is a mentor associated with a support group such as Alcoholics Anonymous "AA" and/or the link 1720 may be associated with the monitored individuals 48 supervisor 66. The location and resource interface 1700 may include a link 1730, wherein the monitored individual 48 may locate a shelter using the link 1730. The location interface and resource interface 1700 may include a link 1740, wherein the monitored individual 48 may view his progress report 1300. The location and resource interface 1700 may include a link 1750, wherein the monitored individual 48 may redeem one or more rewards associated with the monitored individual's 48 compliance with one or more monitored requirements. The location and resource interface 1700 may include a link 1760, wherein the monitored individual 48 may access additional resources, wherein the additional resource may be customized by the monitored individual 48 and/or supervisor 66. In some instances, the one or more links 1710-1760 may be preprogramed, may be programmed by the monitored individual 48 or may be programmed by the supervisor 66 or combination thereof.

Referring now also to FIG. 18, there is shown a diagrammatic view of a wristlet tether 1800. In some embodiments, the client monitoring process 16 may further include a wristlet tether 1800 and/or an ankle tether (not shown). The smartphone 32 may wirelessly couple to the wristlet tether 1800 using a short-range wireless connection. The short-range wireless connection may include one or more proprietary wireless interfaces and/or protocols. Other forms of interconnection (e.g., Near Field Communication (NFC)) may also be used.

In some embodiments, the wristlet tether 1800 may include a vibrator (not shown), wherein the vibrator may be used to prompt the monitored individual 48 to check-in 540. For example, the, monitored individual 48 may be required to periodically check-in 540, check-in 540 at random times, be prompted to check-in 540 based upon a sensor output or an alert, check-in 540 in response to a prompt from the supervisor 66 or combination thereof. The monitored individual 48 may be required to periodically charge the wristlet tether 1800 and/or maintain a minimum charge level on the wristlet tether 1800, and the vibrator may be used to prompt the monitored individual 48 to comply with these requirements. The wristlet tether 1800 may include one or more battery status indicators. For example, one or more Light-emitting diodes (LED) lights 1830 may be encapsulated into the wristlet tether 1800, wherein the one or more LED lights 1830 may indicate the battery status of the wristlet tether 1800.

In some embodiments, the wristlet tether 1800, may include one or more sensor(s) (not shown), wherein the one or more sensor(s) include a Blood Alcohol Concentration (BAC) sensor (not shown). In some instances the BAC sensor may be Near-Infrared Spectroscopy (NIRS) sensor. The wristlet tether 1800 may further include a body temperature sensor (not shown), wherein the body temperature sensor may be used with the NIRS sensor to determine the monitored individuals 48 BAC.

In some embodiments, the one or more sensor(s) may include one or more biometric sensor(s), wherein the biometric sensor(s) are configured to collect personally identifiable information, wherein the personally identifiable information pertains to a monitored individual 48, and enables the monitored individual 48 to be uniquely identified. The personally identifiable information may include location information, and the one or more sensor(s) may include a GPS sensor. The one or more sensor(s) may include one or more biosensor(s), wherein the biosensor is an analytical device, used for the detection of one or more physicochemical and/or biological components and/or substances.

In some embodiments, the one or more of the sensor(s) may be configured to detect legal and/or illegal use of one or more substances by the monitored individual 48. For example, the one or more sensor(s) may be configured to detect whether the monitored individual 48 is taking an illegal substance, such as cocaine. The one or more sensor(s) may be configured to detect whether the monitored 48 it taking a legal substance, such as prescription and/or non-prescription drugs. For example, the one or more sensor(s) may be configured to determine whether the monitored individual 48 is taking a legal substance, and thereby in compliance with a self-medication requirement, wherein compliance with a self-medication program is a requirement of a mental health wellbeing program. The one or more sensor(s), and/or smartphone 32 usage analysis, may be configured to detect physiological and/or behavioral characteristics of the monitored individual 48, and thereby changes in behavioral patterns. These physiological and/or behavioral characteristics may be used to determine the physiological wellbeing of the monitored individual 48. For example, whether the monitored individual 48 is suffering from depression, mood swings, anxiety, and/or one or more behavioral changes. The one or more sensor(s) may include one or more health, medical and/or fitness sensors. For example, one or more sensor(s) may be configured to monitor one or more of, pulse, blood pressure, body temperature, blood oxygen, galvanic skin response, calories, movement and activity etc., which the monitored individual 48 may be required to be in compliance with as part of the client monitoring process 16. The one or more sensor(s) may include one or more proprietary sensor(s). While, the one or more sensor(s) have been depicted as residing in whole or part on the wristlet tether 1800 this is intended to be for illustrative purposes only. The one or more sensor(s) may reside in whole or part on the smartphone 32.

In some embodiments, the wristlet tether 1800 may include a fiber optic circuit band and/or a fiber optic circuit board (not shown). The electronics and/or sensor(s) of the wristlet tether 1800 may be associated with the fiber optic circuit board, and the fiber optic circuit board may in whole or part be PCBA (Printed Circuit Board Assembly). The electronics and/or sensor(s) of the wristlet tether 1800 may further be encapsulated in an enclosure 1810, wherein the enclosure 1810 is waterproof and/or shockproof. A waterproof enclosure 1810 may enable the wristlet tether 1800 to be fully and/or partly immersed in water, wherein the monitored individual 48 may engage in activities such as swimming and/or taking a shower or bath, without having to remove the wristlet tether 1800 to prevent damage. A shockproof enclosure 1810 may enable the wristlet tether 1800 to be worn by the monitored individual 48 while engaged in physical activities such as sports, without having to remove the wristlet tether 1800 to prevent damage. The enclosure 1810 may be configured to be couple to the monitored individual 48 by one or more fasteners 1820, wherein the one or more fasteners 1820 are tamper-proof. The tamper-proof fasteners 1820 may allow the supervisor 66 to determine if the monitored individual 48 has remove or attempted to remove the wristlet tether 1800.

Referring once more to FIG. 1, a monitoring process may be coupled to a computer or computer network. For example, server monitoring process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server monitoring process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a flash drive, a tape drive; an optical drive; a RAID array; a random access memory (RAM); a read-only memory (ROM); an erasable programmable read-only memory (EPROM); and a Flash memory.

Server computer 20 may execute a web server application, examples of which may include but are not limited to: Microsoft® IIS, Novell® Web Server™, or Apache® Tomcat®, that allows for access to server computer 20 (via network 22) using one or more protocols, examples of which may include but are not limited to HTTP (i.e., HyperText Transfer Protocol), SIP (i.e., session initiation protocol), and the Lotus® Sometime® VP protocol. (Webserver is a trademark of Novell Corporation in the United States, other countries, or both; Apache and Tomcat are registered trademarks of Apache Software Foundation in the United States, other countries, or both; Lotus and Sometime are registered trademarks of International Business Machine Corporation in the United States other countries, or both). Network 22 may be connected to one or more secondary networks (e.g., network 26), examples of which may include but are not limited to: a local area network, a wide area network; or an intranet, for example.

In addition/as an alternative to server monitoring process 10, one or more client monitoring processes (e.g., client monitoring processes 12, 14, 16, 18) may reside on and may be executed by one or more client electronic devices (e.g., client electronic devices 28, 30, 32, and/or 34, respectively). Accordingly, in some embodiments, the monitoring process may be a server-side process, in which all of the functionality may be performed on server computer 20. Further, the monitoring process may be a client-side process, in Which all of the functionally may be performed on a client electronic device. In still further embodiments, the monitoring process may include a hybrid server-client process, in which at least some of the functionality may be performed by a server device and at least some of the functionality may be performed by a client device.

Examples of client electronic devices may include but are not limited to personal computer 28, laptop computer 30, a smartphone 32, notebook computer 34, personal digital assistant (not shown), and an application specific device, such as an ankle bracelet (not shown), a tablet (not shown), a server (not shown), a television (not shown), a smart television (not shown), a media (e.g., video, photo, etc.) capturing device (not shown), and a dedicated network device (not shown). Client electronic devices 28, 30, 32, 34 may each be coupled to network 22 and/or network 26 and may each execute an operating system, examples of which may include but are not limited to Android™, Apple® iOS®, Mac® OS X®; Microsoft® Windows®, Microsoft Windows CEO, Red Hat® Linux®, or a custom operating system. (Android is a registered trademark of Google Inc.; Microsoft and Windows are registered trademarks of Microsoft Corporation in the United States, other countries or both; Apple iOS, Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of client monitoring processes 12, 14, 16, 18, which may be stored on storage devices 36, 38, 40, and 42 (respectively) coupled to client electronic devices 28, 30, 32, and 34 (respectively), may be executed by one or more processors (not shown) and one or more memory architectures (not shown) incorporated into client electronic devices 28, 30, 32, 34 (respectively). Storage devices 36, 38, 40, and 42 may include but are not limited to: a hard disk drive; a solid state drive (SSD): a flash drive, a tape drive; an optical drive; a RAID array; a random access memory (RAM); a read-only memory (ROM); an erasable programmable read-only memory (EPROM); and a Flash memory.

Users 44, 46, 48, and 50 (also variously referred to as "monitored individuals," "monitors" 66, "administrators" 66 or "supervisors" 66) may access a monitor process in various ways. For example, one or more of these users may access server monitor process 10 directly through the device on which a client process (e.g., client monitoring processes 12, 14, 16, 18) is executed, namely client electronic devices 28, 30, 32, 34. Users 44, 46, 48, 50 may access server monitor process 10 directly through network 22 and/or through secondary network 26. Further, server computer 20 (i.e., the computer that executes server monitor process 10) may be connected to network 22 through secondary network 26, as illustrated with phantom link line 52. Users 44, 46, 48, 50 may also access a monitoring application in similar ways. Monitoring process 10 may include one or more user interfaces, such as browsers and textual or graphical user interfaces, through which users 44, 46, 48, 50 may access monitoring process 10.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, and/or Bluetooth device that is capable of establishing wireless communication channel 54 between laptop computer 30 and WAP 56. Smartphone 32 is shown wirelessly coupled to network 22 via wireless communication channel 58 established between smartphone 32 and cellular network/bridge 60, which is shown directly coupled to network 22.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smartphones, and other electronic devices to be interconnected using a short-range wireless connection. The short-range wireless connection may include one or more proprietary wireless interfaces and/or protocols. Other forms of interconnection (e.g., Near Field Communication (NFC)) may also be used.

For the enclosed discussion, client monitoring process 16 has been described for illustrative purposes. It will be understood that client monitoring process 16 may, for example, interact and/or communicate with server monitor process 10 and/or may be executed within one or more applications that allow for communication with other server and/or client monitor processes. This is not intended to be a limitation a this disclosure, as other configurations are possible (e.g., smartphone monitor process 16 may include stand-alone client processes and/or stand-alone server processes.) For example, some embodiments may include one or more of client monitor processes 12, 14, 18 or server monitor process 10 in place of or in addition to client monitoring application 76.

Computer 20 may include a data store, such as a database (e.g., relational database, object-oriented database, triple-store database, etc.) and may be located within any suitable memory location, such as storage device 24 coupled to computer 20. Any data described throughout the present disclosure may be stored in the data store. In some embodiments, computer 20 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Monitor process 10 may be a component of the data store, a stand-alone application that interfaces with the above noted data store and/or an applet/application that is accessed via client applications 22, 24, 26, and 28. The above noted data store may be, in whole or in part, distributed in a cloud computing topology. In this way, computer 20 and storage device 24 may refer to multiple devices, which may also be distributed throughout the network.

Computer 20 may execute a monitoring application (e.g., monitoring application 72). Monitor process 10 and/or monitor application 72 may be accessed via client applications 70, 74, 76, and 78. Monitor process 10 may be a standalone application, or may be an applet/application/script/extension that may interact with and/or be executed within monitor application 72, a component of monitor application 72, and/or one or more of client applications 70, 74, 76, and 78. Monitor application 72 may be a standalone application, or may be an applet/application/script/extension that may interact with and/or be executed within monitor process 10, a component of monitor process 10, and/or one or more of client applications 70, 74, 76, and 78. One or more of client applications 70, 74, 76, and 78 may be a standalone application, or may be an applet/application/script/extension that may interact with and/or be executed within and/or be a component of monitor process 10 and/or monitor application 72. The instruction sets and subroutines of client applications 70, 74, 76, and 78, which may be stored on storage devices 36, 38, 40, 42, coupled to client electronic devices 28, 30, 32, and 34 may be executed by one or more processors (not shown) and one or more memory architectures (not shown) incorporated into client electronic devices 28, 20, 32, and 34.

One or more of client applications 70, 74, 76, and 78 may be configured to effectuate some or all of the functionality of motoring application 20 (and vice versa). Accordingly, monitoring application 20 may be a purely server-side application, a purely client-side application, or a hybrid server-side/client-side application that is cooperatively executed by one or more of client applications 70, 74, 76, and 78 and/or monitoring application 20. As one or more of client applications 70, 74, 76, and 78, monitoring process 10, and monitoring application 20, taken singly or in any combination, may effectuate some or all of the same functionality, any description of effectuating such functionality via one or more of client applications 70, 74, 76, and 78, monitoring process 10, monitoring application 20, or combination thereof, and any described interaction(s) between one or more of client applications 70, 74, 76, and 78, monitoring process 10, monitoring application 20, or combination thereof to effectuate such functionality, should be taken as an example only and not to limit the scope of the disclosure.

As will be appreciated by one skilled in the art, aspects of the present disclosure may be implemented as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product implemented in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical drive, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiment(s) thereof, it will be apparent that modifications, variations, and any combinations of embodiment(s) (including any modifications, variations, and combinations thereof) are possible without departing from the scope of the disclosure defined in the appended claims.

What is claimed is:

1. A monitoring method comprising:
    monitoring one or more sensor(s) associated with an electronic monitoring device, wherein the one or more sensor(s) include one or more biometric sensor(s) configured to collect personally identifiable information, wherein the personally identifiable information pertain to a monitored individual and enables the monitored individual to be uniquely identified, wherein the one or more sensor(s) includes a Blood Alcohol Concentration (BAC) sensor;
    enabling a wireless transmitter to transmit the personally identifiable information compiled into a progress report on the monitored individual from a smartphone to a monitoring application, wherein the monitoring application is a web based application;
    determining the monitored individual's compliance with one or more monitored requirements, wherein at least one monitored requirement pertains to the smartphone and periodically monitoring a charging requirement of the smartphone; and
    administering a reward system, wherein the reward system is configured to modify one or more reporting requirements by the monitored individual.

2. The monitoring method of claim 1 wherein the personally identifiable information includes biometric data, wherein the biometric data includes one or more of a DNA analysis, an earlobe geometry analysis, a facial recognition analysis, a fingerprint analysis, a hand geometry analysis, an eye patterns analysis, a signature analysis and a voice waveform analysis.

3. The monitoring method of claim 1 wherein the one or more sensor(s) include a camera, wherein the camera is configured to capture a real-time image of the monitored individual, wherein the real-time image is personally identifiable information.

4. The monitoring method of claim 1 further comprising:
    comparing the real-time image of the monitored individual with a reference image of the monitored individual;
    recording the real-time image of the monitored individual; and
    storing personally identifiable information.

5. The monitoring method of claim 1 wherein the progress report on the monitored individual is periodically transmitted, randomly transmitted, transmitted based upon a sensor output or an alert, transmitted based upon a predefined schedule, transmitting in response to a prompt from a monitoring network, or at the initiation of the monitored individual.

6. The monitoring method of claim 1 further comprising:
    generating a personal passcode; and
    prompting the monitored individual for the personal passcode.

7. The monitoring method of claim 1,
    wherein the monitored requirements further include one or more of an abstinence requirement, a curfew requirement, a probation requirement, compliance with a protection order, compliance with a court order, compliance with a self-medication requirement, compliance with one or more geographical constraints, attendance of one or more self-help meetings, attendance at one or more court hearings, attendance at one or more probation officer meetings, and one or more individual proximity restrains.

8. A monitoring system comprising:
    at least one processor device;
    at least one memory architecture coupled with the at least one processor device;
    a first software module executable by the at least one processor and the at least one memory architecture, wherein the first software module is configured to monitor one or more sensor(s), wherein the one or more sensor(s) include one or more biometric sensor(s) configured to collect personally identifiable information, wherein the personally identifiable information pertain to a monitored individual and enables the monitored individual to be uniquely identified; and a second software module executed by the at least one processor and the at least one memory architecture, wherein the second software module is configured to:
enable a wireless transmitter to transmit the personally identifiable information compiled into a progress report on the monitored individual from a smartphone to a monitoring application, wherein the monitoring application is a web based application,
determine the monitored individual's compliance with one or more monitored requirements, wherein at least one monitored requirement pertains to the smartphone and periodically monitoring a charging requirement of the smartphone, and
administer a reward system, wherein the reward system is configured to modify one or more reporting requirements by the monitored individual.

9. The monitoring system of claim 8 wherein the one or more sensor(s) includes a camera, wherein the camera is configured to capture a real-time image of the monitored individual, wherein the real-time image is personally identifiable information.

10. The monitoring system of claim 8 further comprising:
a wristlet tether, wherein the wristlet tether includes a Blood Alcohol Concentration (BAC) sensor and a body temperature sensor, wherein the BAC sensor is a Near-Infrared Spectroscopy (NIRS) sensor.

11. The monitoring system of claim 8,
wherein the wristlet tether includes a biosensor.

* * * * *